(12) United States Patent  (10) Patent No.: US 9,387,872 B2
Chae  (45) Date of Patent: Jul. 12, 2016

(54) CONTROL METHOD OF VEHICLE, AND VEHICLE ADOPTING THE METHOD

(71) Applicant: HANWHA TECHWIN CO., LTD., Changwon-si (KR)

(72) Inventor: Hee-Seo Chae, Changwon (KR)

(73) Assignee: Hanwha Techwin Co., Ltd., Changwon-si (KR)

( * ) Notice: Subject to any disclaimer, the term of this patent is extended or adjusted under 35 U.S.C. 154(b) by 0 days.

(21) Appl. No.: 14/404,968

(22) PCT Filed: May 13, 2013

(86) PCT No.: PCT/KR2013/004197
§ 371 (c)(1),
(2) Date: Dec. 2, 2014

(87) PCT Pub. No.: WO2013/191378
PCT Pub. Date: Dec. 27, 2013

(65) Prior Publication Data
US 2015/0134203 A1  May 14, 2015

(30) Foreign Application Priority Data

Jun. 18, 2012 (KR) .................. 10-2012-0065161
Jun. 19, 2012 (KR) .................. 10-2012-0065612

(51) Int. Cl.
*B62D 1/00* (2006.01)
*B62D 5/04* (2006.01)
(Continued)

(52) U.S. Cl.
CPC .............. *B62D 5/04* (2013.01); *B60L 15/2036* (2013.01); *B60T 7/12* (2013.01); *B60L 2220/46* (2013.01);
(Continued)

(58) Field of Classification Search
CPC ......... B62D 5/04; B60T 7/12; B60L 15/2036; B60L 2220/46
USPC ............... 701/41, 22, 36; 180/408, 421, 6.44, 180/443, 410, 415; 303/140, 189
See application file for complete search history.

(56) References Cited

U.S. PATENT DOCUMENTS 7,792,619 B2  9/2010 Uryu
2004/0099469 A1* 5/2004 Koibuchi ............... B60T 8/175
 180/421

(Continued)

FOREIGN PATENT DOCUMENTS

JP  9-84215 A  3/1997
JP  2005-225340 A  8/2005
(Continued)

OTHER PUBLICATIONS

International Search Report (PCT/ISA/210) dated Aug. 28, 2013, issued by the International Searching Authority in International Application No. PCT/KR2013/004197.
(Continued)

*Primary Examiner* — Dalena Tran
(74) *Attorney, Agent, or Firm* — Sughrue Mion, PLLC

(57) ABSTRACT

Provided is a method of controlling a vehicle equipped with individual steering devices and individual rotational force generating devices for respective wheels. According to the method, operation of at least one group of the steering devices and the rotational force generating devices is controlled in response to electrical control signals generated according to a user's command, so that control of the wheels starts at separate points in time.

18 Claims, 37 Drawing Sheets

(51) Int. Cl.
  *B60L 15/20* (2006.01)
  *B60T 7/12* (2006.01)

(52) U.S. Cl.
  CPC ........ *B60L 2240/423* (2013.01); *B60L 2260/28* (2013.01); *B60W 2720/30* (2013.01); *Y02T 10/645* (2013.01); *Y02T 10/72* (2013.01); *Y02T 10/7275* (2013.01)

(56) References Cited

U.S. PATENT DOCUMENTS

2004/0230361 A1* 11/2004 Oshima ................ B62D 7/1509 701/69
2007/0131473 A1* 6/2007 Jonasson ............. B62D 7/1581 180/408
2011/0036660 A1 2/2011 Kojo et al.
2011/0259663 A1 10/2011 Goutsu et al.
2012/0116619 A1 5/2012 Tate et al.

FOREIGN PATENT DOCUMENTS

| KR | 10-2007-0120631 A | 12/2007 |
| KR | 10-2008-0008514 A | 1/2008 |
| KR | 10-2009-0067332 A | 6/2009 |
| KR | 10-2011-0089602 A | 8/2011 |
| KR | 10-2012-0024170 A | 3/2012 |

OTHER PUBLICATIONS

Written Opinion (PCT/ISA/238) dated Aug. 28, 2013, issued by the International Searching Authority in International Application No. PCT/KR2013/004197.

\* cited by examiner

| TARGET STEERING ANGLE | CURRENT TRAVELLING SPEED | STEERING ANGLE OF FRONT WHEELS |
|---|---|---|
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

| TARGET STEERING ANGLE | CURRENT STEERING ANGLE OF VEHICLE | STEERING ANGLE OF REAR WHEELS |
|---|---|---|
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

FIG. 9

| TARGET STEERING ANGLE | CURRENT TRAVELLING SPEED | STEERING ANGLE OF LEFT WHEELS |
|---|---|---|
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

FIG. 10

| TARGET STEERING ANGLE | CURRENT STEERING ANGLE OF VEHICLE | STEERING ANGLE OF RIGHT WHEELS |
|---|---|---|
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

| TARGET STEERING ANGLE | CURRENT TRAVELLING SPEED | STEERING ANGLE OF RIGHT WHEELS |
|---|---|---|
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

| TARGET STEERING ANGLE | CURRENT STEERING ANGLE OF VEHICLE | STEERING ANGLE OF LEFT WHEELS |
|---|---|---|
| ⋮ | ⋮ | ⋮ |
| ⋮ | ⋮ | ⋮ |
| ⋮ | ⋮ | ⋮ |
| ⋮ | ⋮ | ⋮ |
| ⋮ | ⋮ | ⋮ |

| TARGET STEERING ANGLE | CURRENT TRAVELLING SPEED | STEERING ANGLE OF FRONT WHEELS | ROTATIONAL SPEED OF FRONT WHEELS |
|---|---|---|---|
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |

| TARGET STEERING ANGLE | CURRENT STEERING ANGLE OF VEHICLE | STEERING ANGLE OF REAR WHEELS | ROTATIONAL SPEED OF REAR WHEELS |
|---|---|---|---|
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |

| TARGET STEERING ANGLE | CURRENT TRAVELLING SPEED | STEERING ANGLE OF RIGHT WHEELS | ROTATIONAL SPEED OF RIGHT WHEELS |
|---|---|---|---|
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |

| TARGET STEERING ANGLE | CURRENT STEERING ANGLE OF VEHICLE | STEERING ANGLE OF LEFT WHEELS | ROTATIONAL SPEED OF LEFT WHEELS |
|---|---|---|---|
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |

CONTROL METHOD OF VEHICLE, AND VEHICLE ADOPTING THE METHOD

TECHNICAL FIELD

The inventive concept relates to a method of controlling a vehicle and a vehicle using the method, and more particularly, to a method of controlling a vehicle equipped with individual rotational force generating devices and individual steering devices for respective wheels, whereby the individual rotational force generating devices and the individual steering devices are controlled in response to electrical control signals generated according to a user's command, and a vehicle using the method.

BACKGROUND ART

Examples of a vehicle that includes individual rotational force generating devices and individual steering devices for respective wheels and controls the individual rotational force generating devices and the individual steering devices in response to electrical control signals generated according to a user's command may include special-purpose military vehicles, vehicle robots, electric automobiles, and hybrid vehicles.

Such an electric driving and steering vehicle indiscriminately uses a driving control method in spite of being equipped with individual rotational force generating devices and individual steering devices. The electric driving and steering vehicle has a drawback in that it cannot be adaptively driven according to various road conditions.

An example of an electric driving steering vehicle is disclosed in Japanese Patent Application Publication No. 1997-084215 (Applicant: Nipon Soken Inc., Title of Invention: A Driving Motor Control Device for Electric Car). In the vehicle disclosed in the above cited reference, each steering motor is controlled to compensate for a difference in driving forces generated by left and right drive wheels during steering.

However, this vehicle still has a problem in that it cannot be steered or driven adaptively according to various road conditions.

DETAILED DESCRIPTION OF THE INVENTIVE CONCEPT

Technical Problem

The inventive concept provides a method of controlling a vehicle equipped with individual steering devices and individual rotational force generating devices for respective wheels, whereby steering or driving is adaptively performed according to various road conditions, and a vehicle using the method.

Technical Solution

According to an aspect of the inventive concept, there is provided a method of controlling a vehicle equipped with individual steering devices and individual rotational force generating devices for respective wheels.

An operation of at least one group of the steering devices and the rotational force generating devices is controlled in response to electrical control signals generated according to a user's command, so that control of the wheels starts separately at different points in time.

Operation of the steering devices may be controlled by varying points in time when steering of the wheels starts according to a steering mode.

The method may include performing speed acceleration and braking.

In the performing of the speed acceleration, an operation of the rotational force generating devices may be controlled by making a point in time when control of front wheels starts different from a point in time when control of rear wheels starts in a speed acceleration mode.

In the performing of braking, the operation of the rotational force generating devices may be controlled by making a point in time when control of wheels on a first diagonal line starts different from a point in time when control of wheels on a second diagonal line starts in a braking mode.

According to another aspect of the inventive concept, there is provided a vehicle equipped with individual steering devices and individual rotational force generating devices for respective wheels.

An operation of at least one group of the steering devices and the rotational force generating devices is controlled in response to electrical control signals generated according to a user's command, so that control of the wheels starts separately at different points in time.

Effects of Inventive Concept

According to the method of controlling a vehicle and a vehicle using the same, control of the wheels starts at different points in time, and thus, adaptive steering or driving may be performed according to various road conditions. The reasons for this effect are as follows.

If an operation of steering devices is controlled by varying points in time when steering of wheels starts according to a steering mode, a user may select a stable steering mode or an efficient steering mode according to road conditions.

In a stable steering mode, an operation of steering devices is controlled by making a point in time when steering of front wheels starts different from that when steering of rear wheels starts.

For example, after a lapse of a set time from a point in time when control of operation of the steering devices for the front wheels starts, a steering angle of the rear wheels is set in accordance with a user's target steering angle and a vehicle's current steering angle.

Thus, since a steering angle of the rear wheels may be further adaptively set according to a vehicle's current steering angle, further stable steering may be performed by adapting to poor road conditions.

In an efficient steering mode, the operation of the steering devices is controlled by making a point in time when steering of left wheels starts different from that when steering of right wheels starts.

For example, after a lapse of a set time from a point in time when control of operation of steering devices for the left wheels starts, a steering angle of the right wheels is set according to a user's target steering angle and a vehicle's current steering angle.

Thus, since a steering angle of the right wheels may be further adaptively set according to a vehicle's current steering angle, further efficient steering may be performed by adapting to smooth roads.

When a speed acceleration operation and a braking operation are performed, in the speed acceleration operation, an operation of rotational force generating devices may be controlled by making a point in time when control of front wheels starts different from that when control of rear wheels starts in a speed acceleration mode.

For example, after a lapse of a set time from a point in time when control of operation of the rotational force generating devices for the front wheels starts, a rotational speed of the rear wheels is set in accordance with a user's target speed and a vehicle's current speed.

Thus, since the rotational speed of the rear wheels may be further adaptively set according to the vehicle's current speed, further stable speed acceleration may be performed by adapting to various road conditions. For example, roll-over of the vehicle during an initial phase of the speed acceleration may be prevented.

Furthermore, in a braking mode, an operation of the rotational force generating devices may be controlled by making a point in time when control of wheels on a first diagonal line starts different from that when control of wheels on a second diagonal line starts.

For example, after a lapse of a set time from a point in time when control of operation of the rotational force generating devices for the wheels on the first diagonal line starts, a steering angle of the wheels on the second diagonal line may be set in accordance with a user's target speed and a vehicle's current speed.

Thus, since a rotational speed of the wheels on the second diagonal line may be further adaptively set according to a vehicle's current speed, efficient braking may be performed by adapting to various road conditions.

Thus, according to the method of controlling a vehicle and a vehicle adopting the same, the vehicle may be adaptively steered or driven according to various road conditions.

DESCRIPTION OF THE DRAWINGS

FIG. 5 illustrates an example of a look-up table (LUT) for performing operation a1 shown in FIG. 4;

FIG. 6 illustrates an example of a LUT for performing operation a3-2 shown in FIG. 4;

FIG. 9 illustrates an example of a LUT for performing operation b1 shown in FIG. 8;

FIG. 10 illustrates an example of a LUT for performing operation b3-2 shown in FIG. 8;

FIG. 13 illustrates an example of a LUT for performing operation c1 shown in FIG. 12;

FIG. 14 illustrates an example of a LUT for performing operation c3-2 shown in FIG. 12;

FIG. 19 illustrates an example of a LUT for performing operation d1 shown in FIG. 18;

FIG. 20 illustrates an example of a LUT for performing operation d3-2 shown in FIG. 18;

BEST MODE

Figure 1:
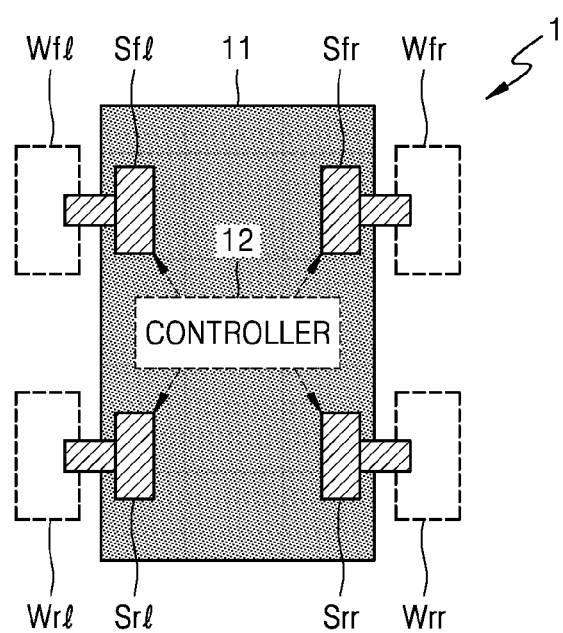
FIG. 1 illustrates a vehicle according to an exemplary embodiment.

FIG. 1 illustrates a vehicle 1 according to an exemplary embodiment. Reference numeral 11 denotes a vehicle body.

Referring to FIG. 1, the vehicle 1 includes individual steering devices Sfl, Sfr, Srl, and Srr for respective wheels Wfl, Wfr, Wrl, and Wrr.

According to a method of controlling the vehicle 1 according to an exemplary embodiment, a controller 12 controls the steering devices Sfl, Sfr, Srl, and Srr in response to electrical control signals generated via user's manipulation for steering. In this case, a user may select a stable steering mode or an efficient steering mode according to road conditions.

In a stable steering mode, the controller 12 controls operation of the steering devices Sfl, Sfr, Srl, and Srr by making a point in time when steering of the front wheels Wfl and Wfr starts different from that when steering of the rear wheels Wrl and Wrr starts.

For example, after a lapse of a set time from a point in time when control of operation of the steering devices Sfl and Sfr for the front wheels Wfl and Wfr starts, a steering angle of the rear wheels Wrl and Wrr is set according to a user's target steering angle and a current steering angle of the vehicle 1. The set time may be 10 ms to 1,500 ms. According to the present embodiment, the set time is 12 ms. In other embodiments, the set time may be 14 ms.

Thus, since the steering angle of the rear wheels Wrl and Wrr may be further adaptively set according to the current steering angle of the vehicle 1, further stable steering may be performed by adapting to poor road conditions.

In an efficient steering mode, the controller 12 may control operation of the steering devices Sfl, Sfr, Srl, and Srr by making a point in time when steering of the left wheels Wfl and Wrl starts different from that when steering of the right wheels Wfr and Wrr starts.

For example, after a lapse of a set time of 12 ms from a point in time when control of operation of the steering devices Sfl and Srl for the left wheels Wfl and Wrl starts, a steering angle of the right wheels Wfr and Wrr is set according to a user's target steering angle and a current steering angle of the vehicle 1.

Thus, since the steering angle of the right wheels Wfr and Wrr may be further adaptively set according to the current steering angle of the vehicle 1, further efficient steering may be performed by adapting to flat road conditions.

Briefly, according to the method of controlling the vehicle 1 and the vehicle 1 adopting the method according to the present embodiments, steering may be adaptively performed according to various road conditions.

Figure 2:
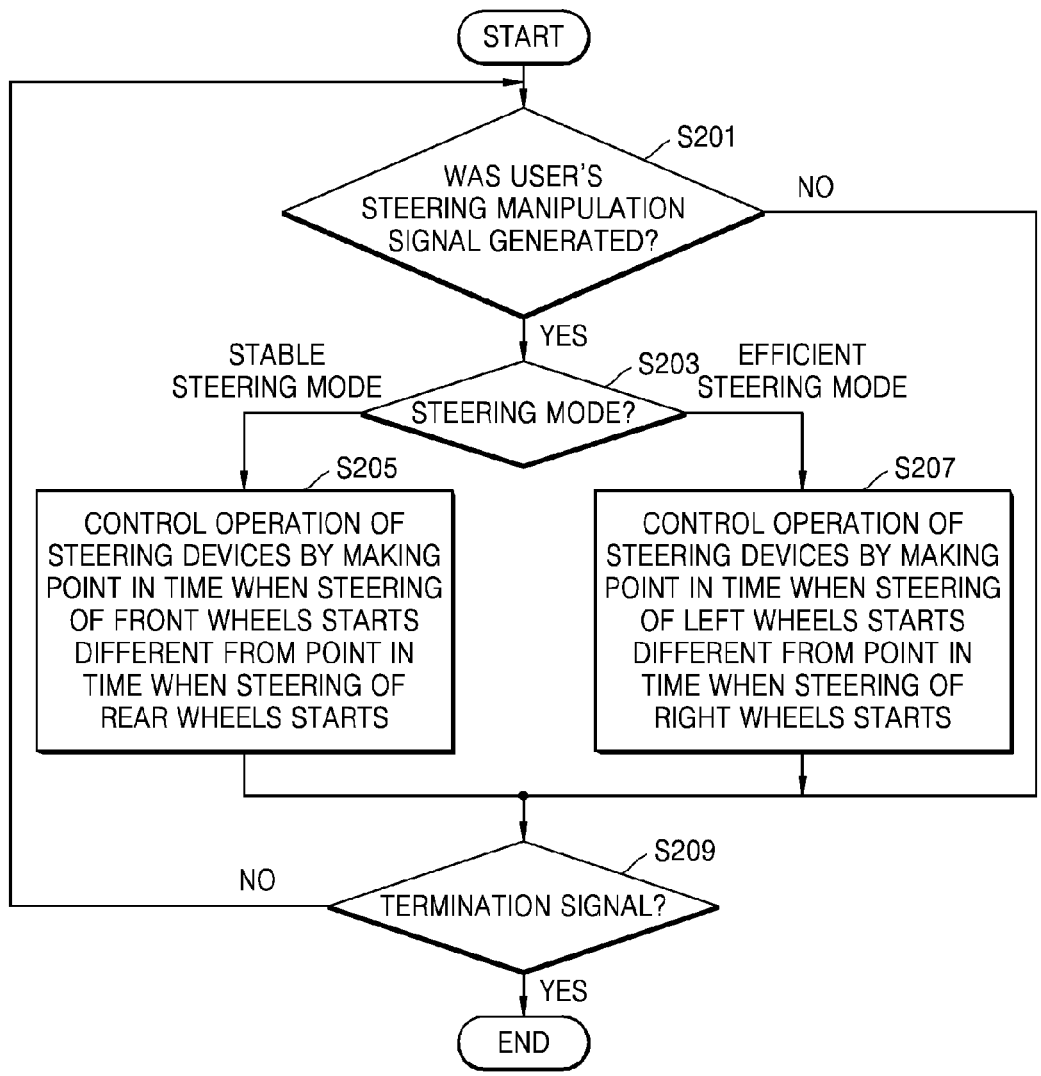
FIG. 2 is a flowchart of a method of controlling a vehicle, which is performed by a controller shown in FIG. 1.

FIG. 2 is a flowchart of a method of controlling the vehicle 1, which is performed by the controller 12 shown in FIG. 1. The method of controlling the vehicle 1 according to the present embodiment will now be described with reference to FIG. 2.

If a user's steering manipulation signal is generated (S201), the controller 12 determines the type of a current steering mode (S203).

If the current steering mode is a stable steering mode, the controller 12 controls an operation of the steering devices Sfl, Sfr, Srl, Srr by making a point in time when steering of the front wheels Wfl and Wfr starts different from that when steering of the rear wheels Wrl and Wrr starts (S205).

If the current steering mode is an efficient steering mode, the controller 12 controls operation of the steering devices Sfl, Sfr, Srl, and Srr by making a point in time when steering of the left wheels Wfl and Wrl starts different from that when steering of the right wheels Wfr and Wrr starts (S207).

The above-described operations S201, S203, S205, and S207 are repeatedly performed until a termination signal is generated (S209).

Figure 3:
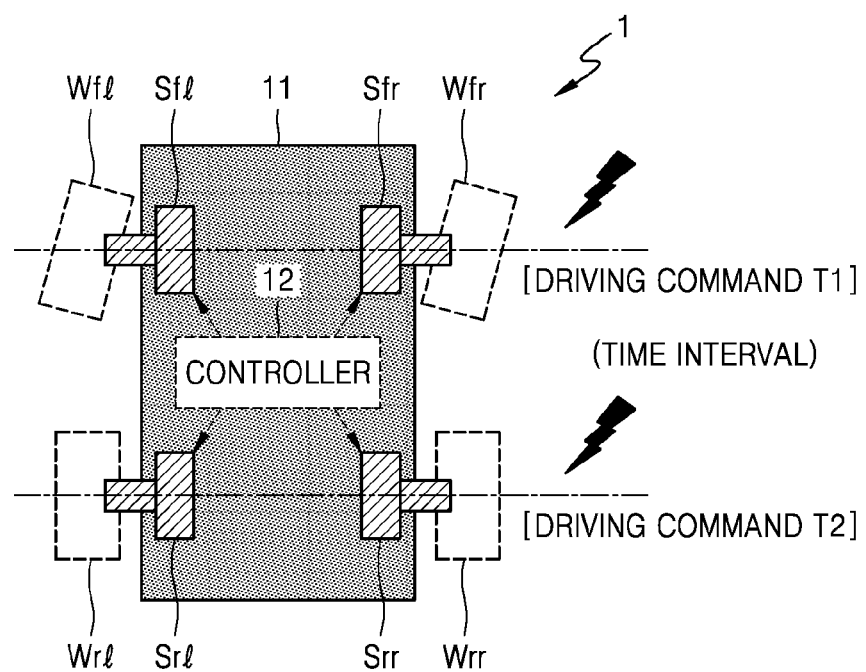
FIG. 3 illustrates a vehicle in which stable steering operation shown in FIG. 2 is performed.

FIG. 3 illustrates a vehicle 1 in which a stable steering operation S205 shown in FIG. 2 is performed. Like reference numerals in FIGS. 1 and 3 indicate elements having the same functions.

Referring to FIG. 3, in the stable steering operation S205, a controller 12 generates a control driving command and inputs the control driving command to steering devices Sfl and Sfr for front wheels Wfl and Wfr at a point in time T1.

Next, at a point in time T2 after a set time interval, e.g., a set time interval of 12 ms lapses, the controller 12 generates a control driving command and inputs the control driving command to steering devices Srl and Srr for rear wheels Wrl and Wrr.

Thus, since a steering angle of the rear wheels Wrl and Wrr may be further adaptively set according to a current steering angle of the vehicle 1 at the point in time T2, further stable steering may be performed by adapting to poor road conditions.

Figure 4:
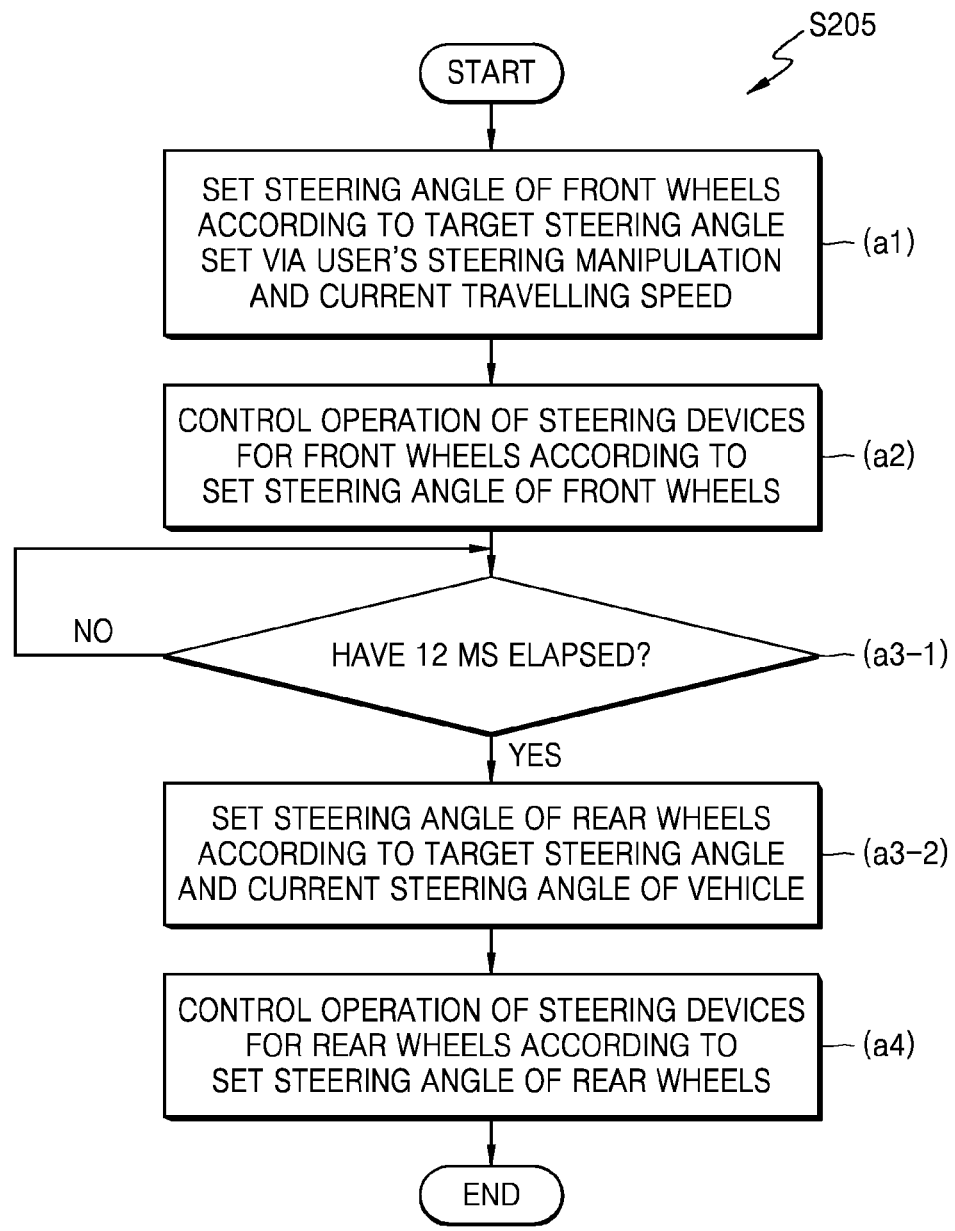
FIG. 4 is a flowchart of a detailed process of the stable steering operation shown in FIG. 2.

FIG. 4 is a flowchart of a detailed process of the stable steering operation S205 shown in FIG. 2, and FIG. 5 illustrates an example of a look-up table (LUT) 51 for performing operation a1 shown in FIG. 4. FIG. 6 illustrates an example of a LUT 61 for performing operation a3-2 shown in FIG. 4.

The detailed process of the stable steering operation S205 will now be described with reference to FIGS. 3 through 6.

First, the controller 12 reads the LUT 51 and sets a steering angle of the front wheels Wfl and Wfr in accordance with a target steering angle set via user's manipulation for steering and a current travelling speed (operation a1).

Then, the controller 12 controls operation of the steering device Sfl and Sfr for the front wheels Wfl and Wfr according to the set steering angle of the front wheels Wfl and Wfr (operation a2).

Next, after a lapse of a set time of 12 ms from point in time T1 when control of operation of the steering device Sfl and Sfr for the front wheels Wfl and Wfr starts (operation a3-1), the controller 12 reads the LUT 61 and sets a steering angle of the rear wheels Wrl and Wrr in accordance with a target steering angle and a current steering angle of the vehicle 1 (operation a3-2).

Thus, the steering angle of the rear wheels Wrl and Wrr may be further adaptively set according to the target steering angle and the current steering angle of the vehicle 1.

Thereafter, the controller 12 controls operation of the steering devices Srl and Srr for the rear wheels Wrl and Wrr according to the set steering angle of the rear wheels Wrl and Wrr (operation a4).

Figure 7:
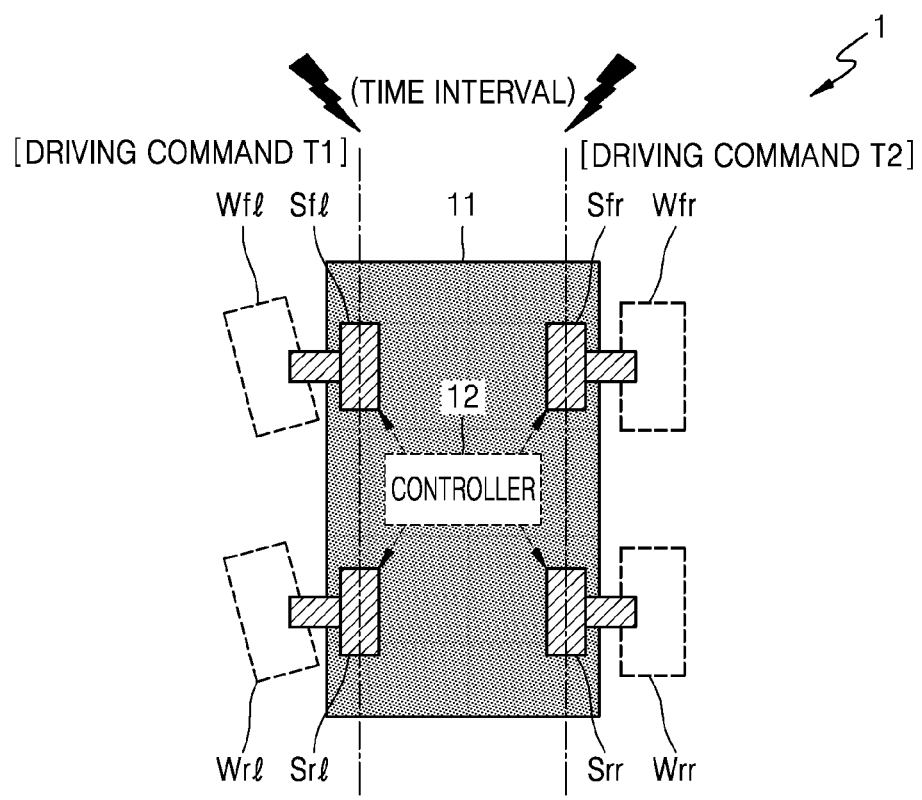
FIG. 7 illustrates a vehicle in which steering in the left direction is performed in efficient steering operation shown in FIG. 2.

FIG. 7 illustrates a vehicle 1 in which a steering in the left direction is performed in efficient steering operation S207 shown in FIG. 2. Like reference numerals in FIGS. 1 and 7 indicate elements having the same functions.

Referring to FIG. 7, in the efficient steering operation S207, a controller 12 generates a control driving command and inputs the control driving command to steering devices Sfl and Srl for left wheels Wfl and Wrl at a point in time T1.

Next, at a point in time T2 after a set time interval, e.g., after a set time interval of 12 ms lapses, the controller 12 generates a control driving command and inputs the control driving command to steering devices Sfr and Srr for right wheels Wfr and Wrr.

Thus, since a steering angle of the right wheels Wfr and Wrr may be further adaptively set according to a current steering angle of the vehicle 1 at the point in time T2, further efficient steering in the left direction may be performed by adapting to smooth road conditions.

Figure 8:
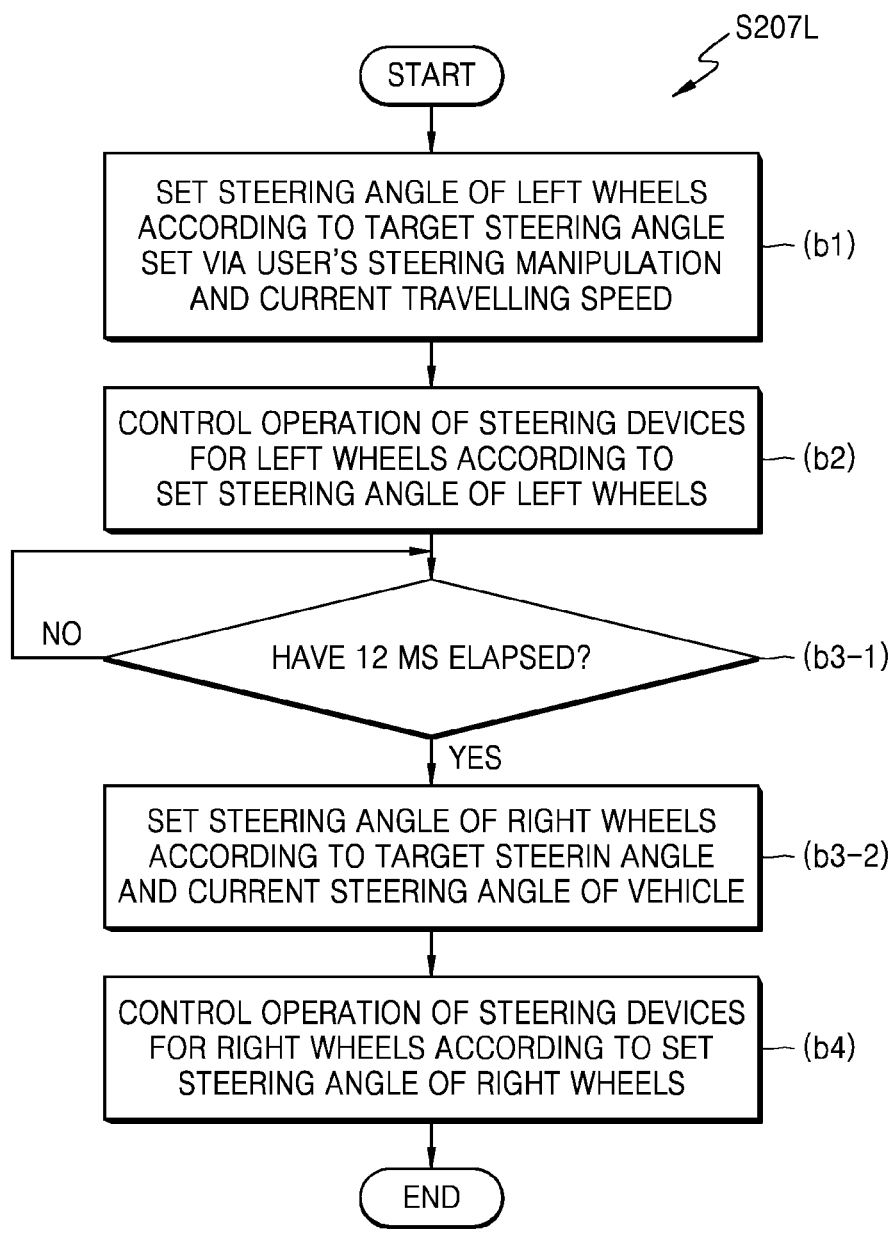
FIG. 8 is a flowchart of a detailed process of operation of performing steering in the left direction in the efficient steering operation shown in FIG. 2.

FIG. 8 is a flowchart of a detailed process of operation S207L of performing steering in the left direction in the efficient steering operation S207 shown in FIG. 2, and FIG. 9 illustrates an example of a LUT 91 for performing operation b1 shown in FIG. 8. FIG. 10 illustrates an example of a LUT 101 for performing operation b3-2 shown in FIG. 8.

The detailed process of operation S207L of performing steering in the left direction in the efficient steering operation S207 will now be described in detail with reference to FIGS. 7 through 10.

First, the controller 12 reads the LUT 91 and sets a steering angle of the left wheels Wfl and Wrl in accordance with a target steering angle set via user's manipulation of steering and a current travelling speed (operation b1).

Then, the controller 12 controls operation of the steering devices Sfl and Srl for the left wheels Wfl and Wrl according to the set steering angle of the left wheels Wfl and Wrl (operation b2).

Next, after a lapse of a set time of 12 ms from the point in time T1 when control of operation of the steering device Sfl and Srl for the left wheels Wfl and Wrl starts (operation b3-1), the controller 12 reads the LUT 101 and sets a steering angle of the right wheels Wfr and Wrr in accordance with a target steering angle and a current steering angle of the vehicle 1 (operation b3-2).

Thus, the steering angle of the right wheels Wfr and Wrr may be further adaptively set according to the target steering angle and the current steering angle of the vehicle 1.

Thereafter, the controller 12 controls operation of the steering devices Sfr and Srr for the right wheels Wfr and Wrr according to the set steering angle of the right wheels Wfr and Wrr (operation b4).

Figure 11:
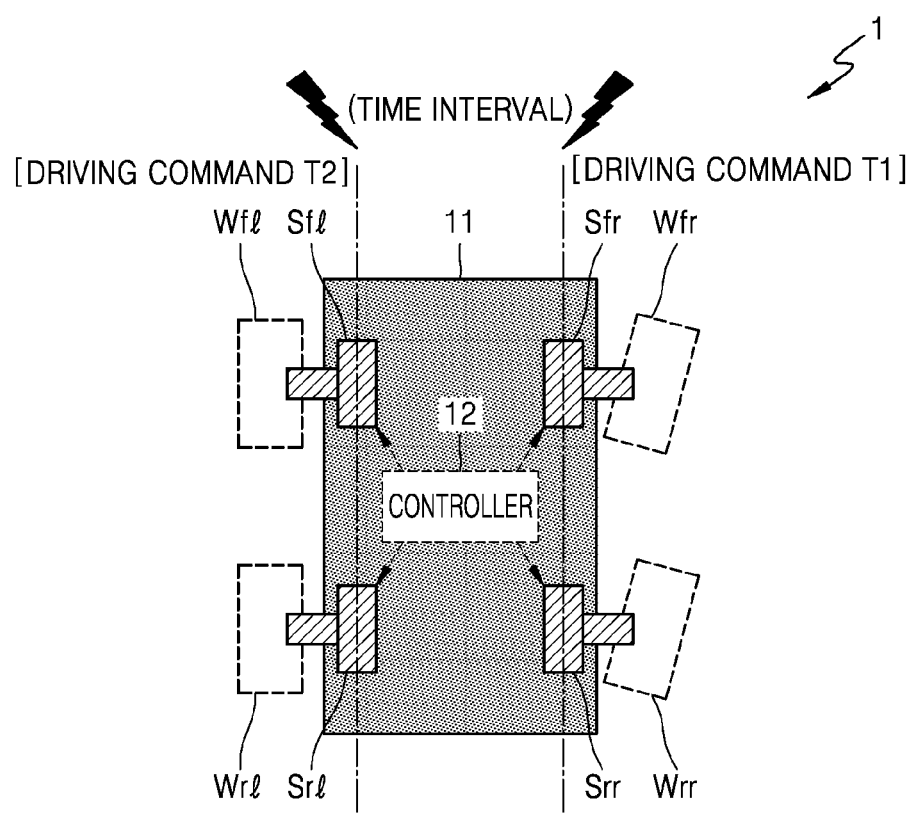
FIG. 11 illustrates a vehicle in which steering in the right direction is performed in the efficient steering operation shown in FIG. 2.

FIG. 11 illustrates a vehicle 1 in which steering in the right direction is performed in the efficient steering operation S207 shown in FIG. 2. Like reference numerals in FIGS. 1 and 11 indicate elements having the same functions.

Referring to FIG. 11, in the efficient steering operation S207, a controller 12 generates a control driving command and inputs the control driving command to steering devices Sfr and Srr for right wheels Wfr and Wrr at point in time T1.

Next, at a point in time T2 after a set time interval, e.g., a set time interval of 12 ms lapses, the controller 12 generates a control driving command and inputs the control driving command to steering devices Sfl and Srl for left wheels Wfl and Wrl.

Thus, since a steering angle of the left wheels Wfl and Wrl may be further adaptively set according to a current steering angle of the vehicle 1 at the point in time T2, further efficient steering in the right direction may be performed by adapting to smooth road conditions.

Figure 12:
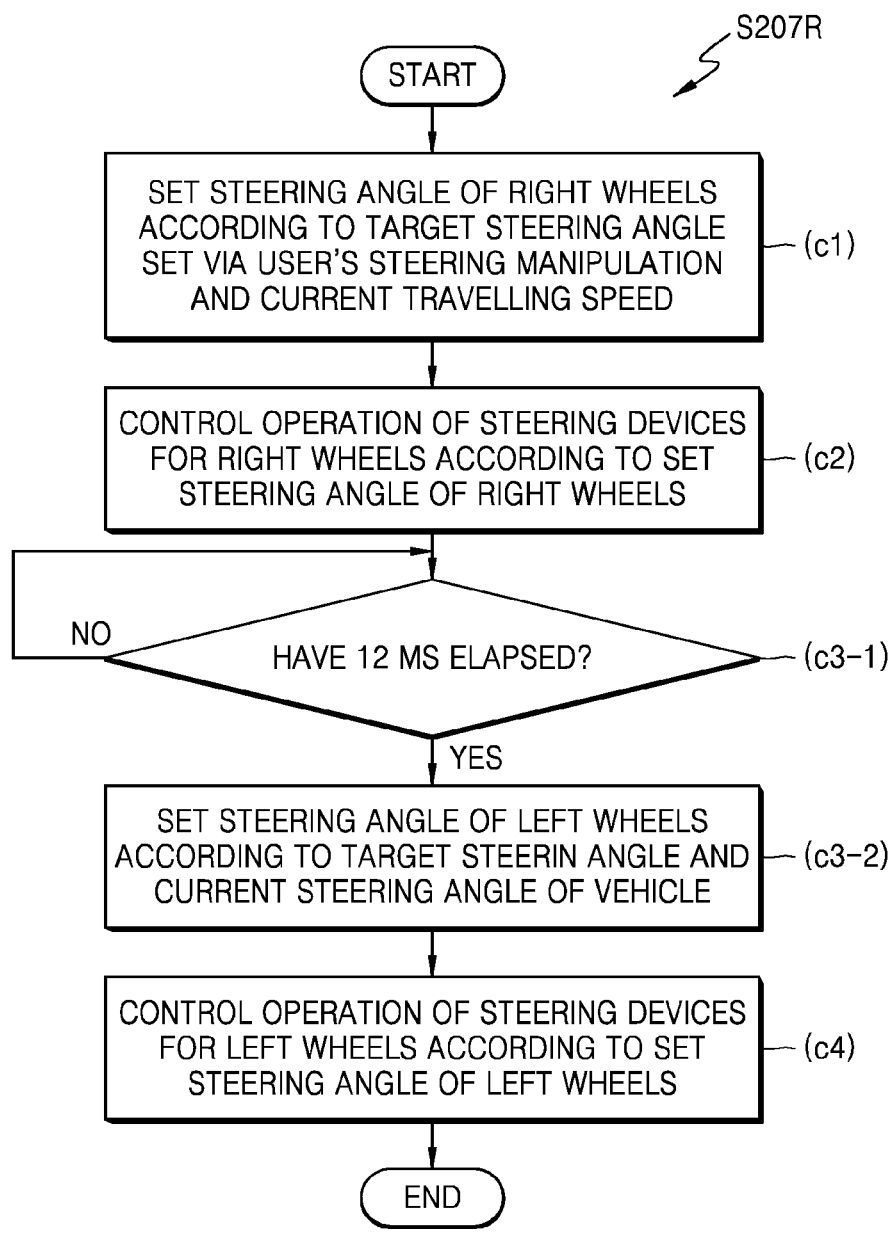
FIG. 12 is a flowchart of a detailed process of operation of performing steering in the right direction in the efficient steering operation shown in FIG. 2.

FIG. 12 is a flowchart of a detailed process of operation S207R of performing steering in the right direction in the efficient steering operation S207 shown in FIG. 2, and FIG. 13 illustrates an example of a LUT 131 for performing operation c1 shown in FIG. 12. FIG. 14 illustrates an example of a LUT 141 for performing operation c3-2 shown in FIG. 12.

The detailed process of operation S207R of performing steering in the right direction in the efficient steering operation S207 will now be described in detail with reference to FIGS. 11 through 14.

First, the controller 12 reads the LUT 131 and sets a steering angle of the right wheels Wfr and Wrr in accordance with a target steering angle set via user's manipulation of steering and a current travelling speed (operation c1).

Then, the controller 12 controls operation of the steering devices Sfr and Srr for the right wheels Wfr and Wrr according to the set steering angle of the right wheels Wfr and Wrr (operation c2).

Next, after a lapse of a set time of 12 ms from the point in time T1 when control of operation of the steering device Sfr and Srr for the right wheels Wfr and Wrr starts (operation c3-1), the controller 12 reads the LUT 141 and sets a steering angle of the left wheels Wfl and Wrl in accordance with a target steering angle and a current steering angle of the vehicle 1 (operation c3-2).

Thus, the steering angle of the left wheels Wfl and Wrl may be further adaptively set according to the target steering angle and the current steering angle of the vehicle 1.

Thereafter, the controller 12 controls operation of the steering devices Sfl and Srl for the left wheels Wfl and Wrl according to the set steering angle of the left wheels Wfl and Wrl (operation c4).

MODE OF THE INVENTIVE CONCEPT

Figure 15:
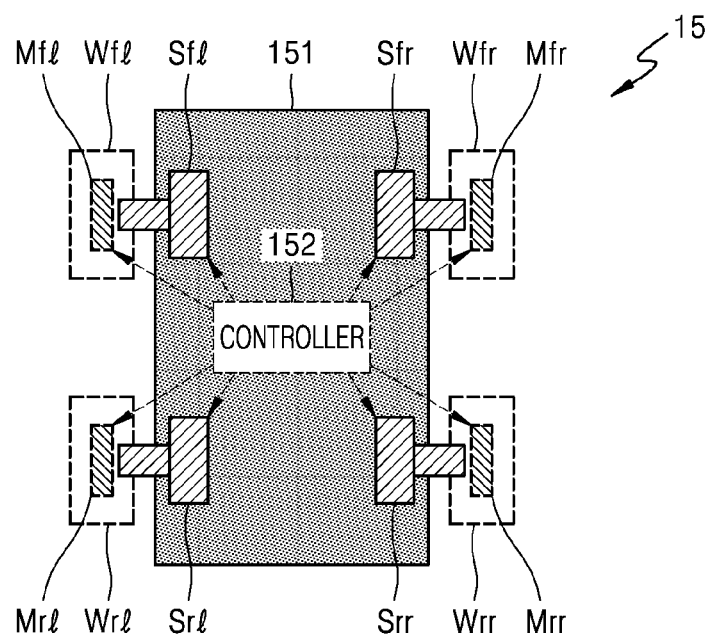
FIG. 15 illustrates a vehicle according to another exemplary embodiment.

FIG. 15 illustrates a vehicle 15 according to another exemplary embodiment. Reference numeral 151 denotes a vehicle body.

Referring to FIG. 15, the vehicle 15 according to the present embodiment includes individual steering devices Sfl, Sfr, Srl, and Srr and individual rotational force generating devices Mfl, Mfr, Mrl, and Mrr, e.g., individual motors, for respective wheels Wfl, Wfr, Wrl, and Wrr.

According to a method of controlling the vehicle 15 according to another exemplary embodiment, a controller 152 controls the steering devices Sfl, Sfr, Srl, and Srr and the rotational force generating devices Mfl, Mfr, Mrl, and Mrr in response to electrical control signals generated via user's manipulation for steering. In this case, a user may select a stable steering mode or an efficient steering mode according to road conditions.

In a stable steering mode, the controller 152 controls operations of the steering devices Sfl, Sfr, Srl, and Srr and the rotational force generating devices Mfl, Mfr, Mrl, and Mrr by making a point in time when steering of the front wheels Wfl and Wfr starts different from that when steering of the rear wheels Wrl and Wrr starts.

For example, after a lapse of a set time from a point in time when control of operations of the steering devices Sfl and Sfr and the rotational force generating devices Mfl and Mfr for the front wheels Wfl and Wfr starts, a steering angle and a rotational speed of the rear wheels Wrl and Wrr are set according to a user's target steering angle and a current steering angle of the vehicle 15. The set time may be 10 ms to 1,500 ms. According to the present embodiment, the set time is 14 ms.

Thus, since the steering angle and the rotational speed of the rear wheels Wrl and Wrr may be further adaptively set according to the current steering angle of the vehicle 15, further stable steering may be performed by adapting to poor road conditions.

In an efficient steering mode, the controller 152 may control operations of the steering devices Sfl, Sfr, Srl, and Srr and the rotational force generating devices Mfl, Mfr, Mrl, and Mrr by making a point in time when steering of the left wheels Wfl and Wrl starts different from that when steering of the right wheels Wfr and Wrr starts.

For example, after a lapse of a set time of 14 ms from a point in time when control of operations of the steering devices Sfl and Srl and the rotational force generating devices Mfl and Mrl for the left wheels Wfl and Wrl starts, a steering angle and a rotational speed of the right wheels Wfr and Wrr may be set according to a user's target steering angle and a current steering angle of the vehicle 15.

Thus, since the steering angle and the rotational speed of the right wheels Wfr and Wrr may be further adaptively set according to the current steering angle of the vehicle 15, further efficient steering may be performed by adapting to smooth road conditions.

Briefly, according to the method of controlling the vehicle 15 and the vehicle 15 adopting the method according to the present embodiments, steering may be adaptively performed according to various road conditions.

Figure 16:
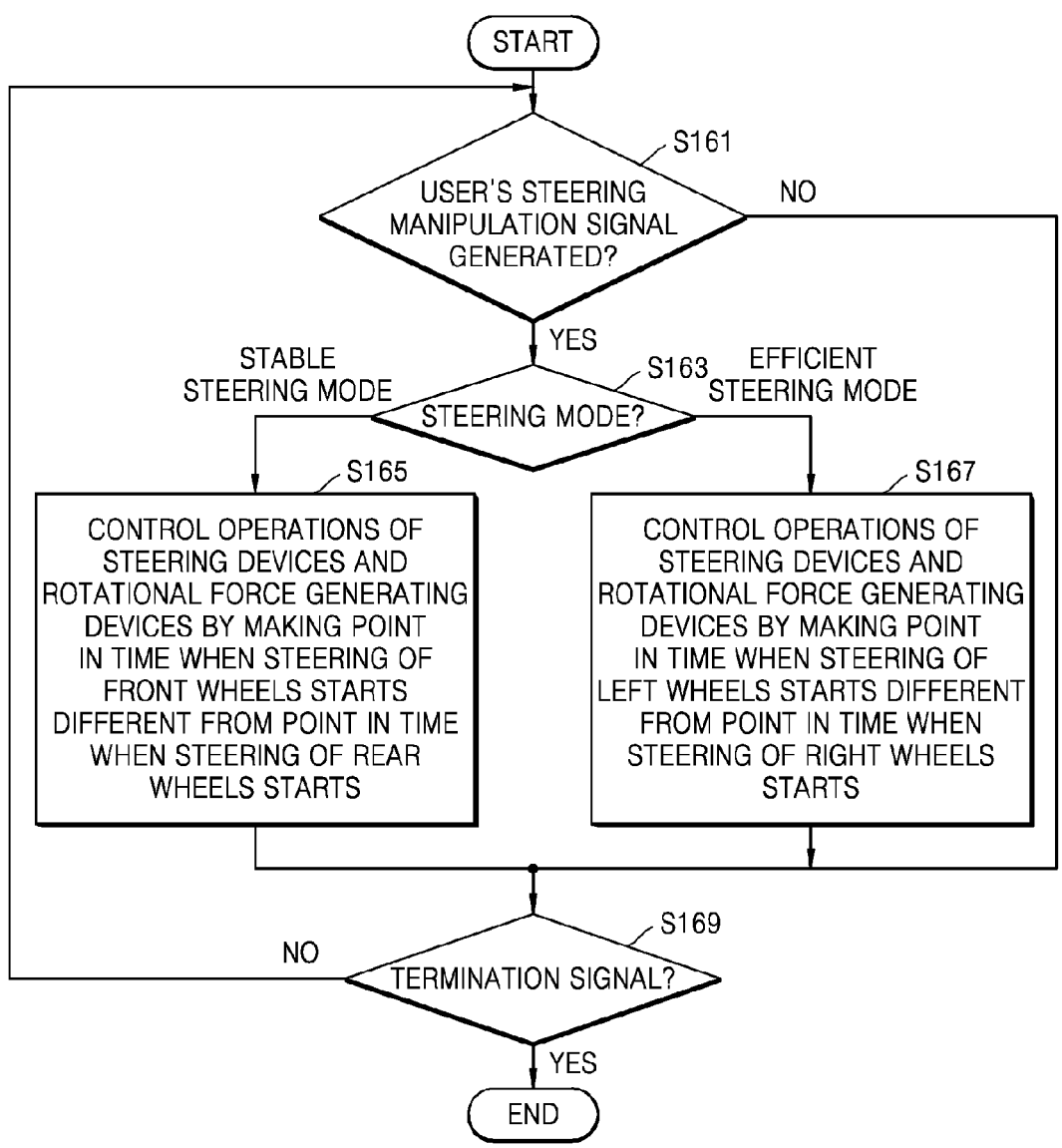
FIG. 16 is a flowchart of a method of controlling a vehicle, which is performed by a controller shown in FIG. 15.

FIG. 16 is a flowchart of a method of controlling the vehicle 15, which is performed by the controller 152 shown in FIG. 15. The method of controlling the vehicle 15 according to the present embodiment will now be described with reference to FIG. 16.

If a user's steering manipulation signal is generated (S161), the controller 152 determines the type of a current steering mode (S163).

If the current steering mode is a stable steering mode, the controller 152 controls operations of the steering devices Sfl, Sfr, Srl, Srr and the rotational force generating devices Mfl, Mfr, Mrl, and Mrr by making a point in time when steering of the front wheels Wfl and Wfr starts different from that when steering of the rear wheels Wrl and Wrr starts (S165).

If the current steering mode is an efficient steering mode, the controller 152 controls operations of the steering devices Sfl, Sfr, Srl, and Srr and the rotational force generating devices Mfl, Mfr, Mrl, and Mrr by making a point in time when steering of the left wheels Wfl and Wrl starts different from that when steering of the right wheels Wfr and Wrr starts (S167).

The above-described operations S161, S163, S165, and S167 are repeatedly performed until a termination signal is generated (S169).

Figure 17:
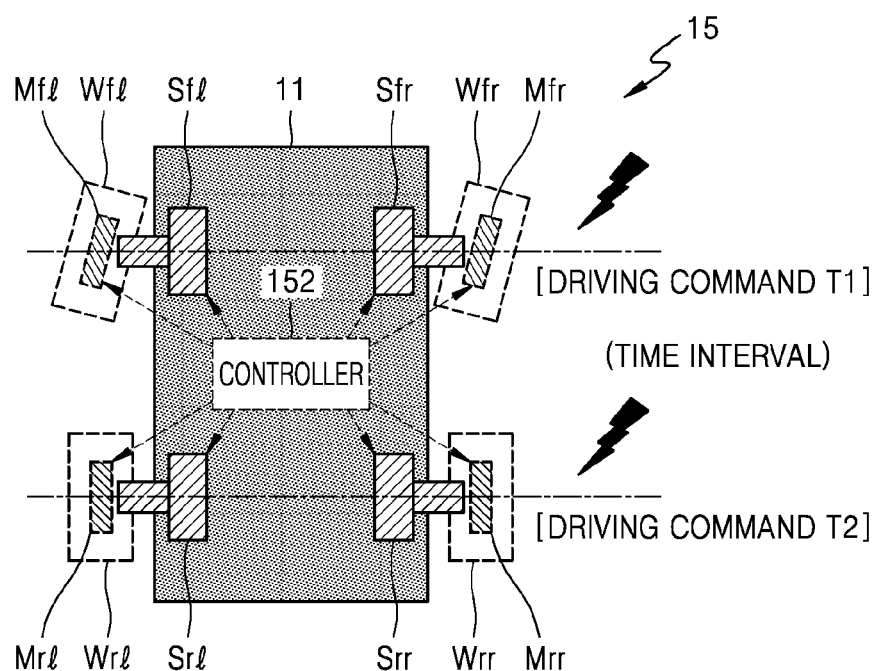
FIG. 17 illustrates a vehicle in which stable steering operation shown in FIG. 16 is performed.

FIG. 17 illustrates a vehicle 1 in which a stable steering operation S165 shown in FIG. 16 is performed. Like reference numerals in FIGS. 15 and 17 indicate elements having the same functions.

Referring to FIG. 17, in the stable steering operation S165, a controller 152 generates a control driving command and inputs the control driving command to steering devices Sfl and Sfr and rotational force generating devices Mfl and Mfr for front wheels Wfl and Wfr at a point in time T1.

Next, at a point in time T2 after a set time interval, e.g., a set time interval of 14 ms lapses, the controller 152 generates a control driving command and inputs the control driving command to steering devices Srl and Srr and rotational force generating devices Mrl and Mrr for rear wheels Wrl and Wrr.

Thus, since a steering angle and a rotational speed of the rear wheels Wrl and Wrr may be further adaptively set according to a current steering angle of the vehicle 15 at the point in time T2, further stable steering may be performed by adapting to poor road conditions.

Figure 18:
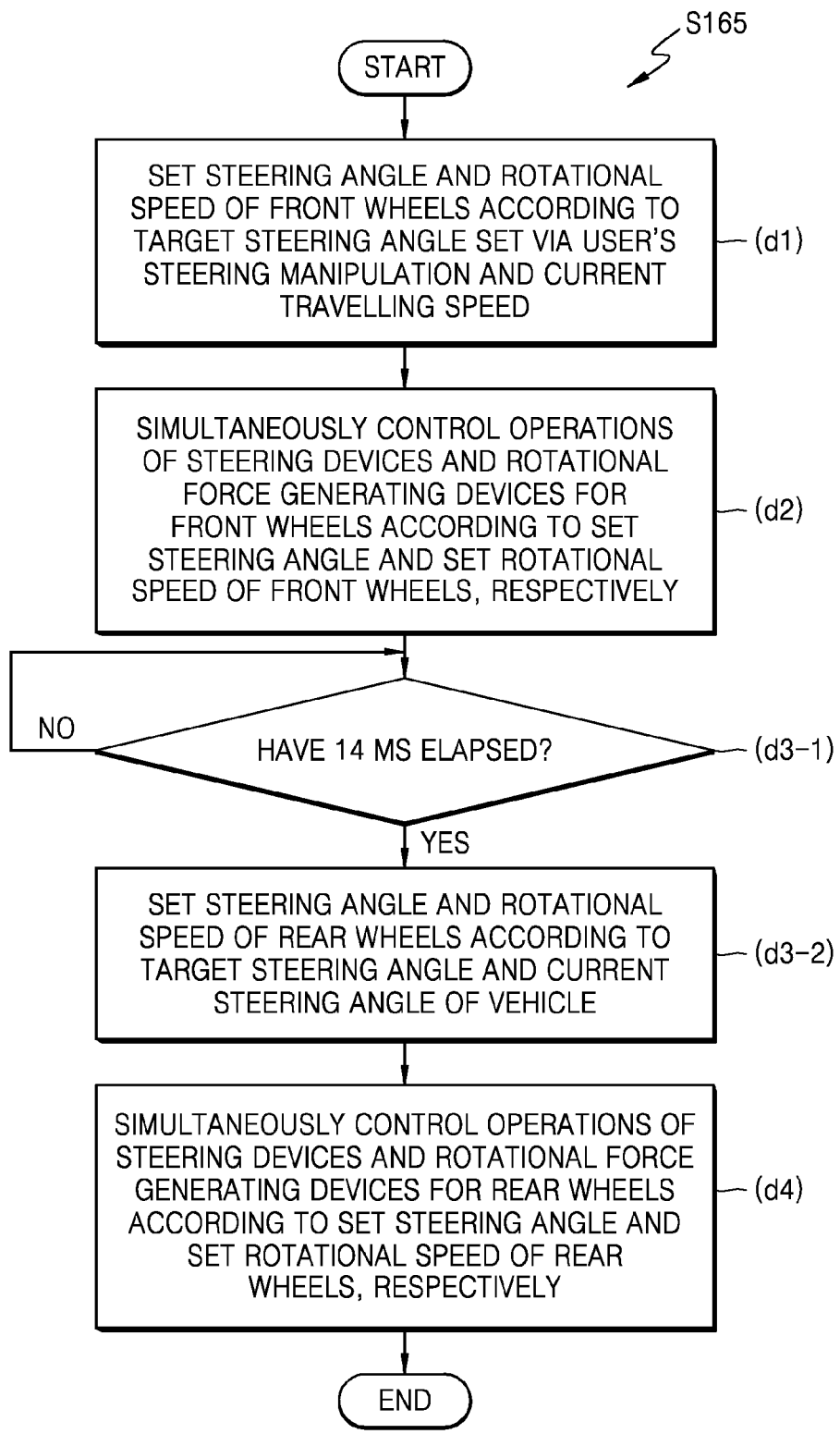
FIG. 18 is a flowchart of a detailed process of the stable steering operation shown in FIG. 16.

FIG. 18 is a flowchart of a detailed process of the stable steering operation S165 shown in FIG. 16, and FIG. 19 illustrates an example of a LUT 191 for performing operation d1 shown in FIG. 18. FIG. 20 illustrates an example of a LUT 201 for performing operation d3-2 shown in FIG. 18.

The detailed process of the stable steering operation S165 will now be described with reference to FIGS. 17 through 20.

First, the controller 152 reads the LUT 191 and sets a steering angle and a rotational speed of the front wheels Wfl and Wfr in accordance with a target steering angle set via user's manipulation for steering and a current travelling speed (operation d1).

Then, the controller 152 controls an operation of the steering device Sfl and Sfr for the front wheels Wfl and Wfr according to the set steering angle of the front wheels Wfl and Wfr while simultaneously controlling an operation of the rotational force generating devices Mfl and Mfr for the front wheels Wfl and Wfr according to the set rotational speed of the front wheels Wfl and Wfr (operation d2).

Next, after a lapse of a set time of 14 ms from a point in time T1 when control of operations of the steering devices Sfl and Sfr and the rotational force generating devices Mfl and Mfr for the front wheels Wfl and Wfr starts (operation d3-1), the controller 152 reads the LUT 201 and sets a steering angle and a rotational speed of the rear wheels Wrl and Wrr in accordance with a target steering angle and a current steering angle of the vehicle 15 (operation d3-2).

Thus, the steering angle and the rotational speed of the rear wheels Wrl and Wrr may be further adaptively set according to the target steering angle and the current steering angle of the vehicle 15.

Thereafter, the controller 152 controls an operation of the steering devices Srl and Srr for the rear wheels Wrl and Wrr according to the set steering angle of the rear wheels Wrl and Wrr while simultaneously controlling operation of the rotational force generating devices Mrl and Mrr for the rear wheels Wrl and Wrr according to the set rotational speed of the rear wheels Wrl and Wrr (operation d4).

Figure 21:
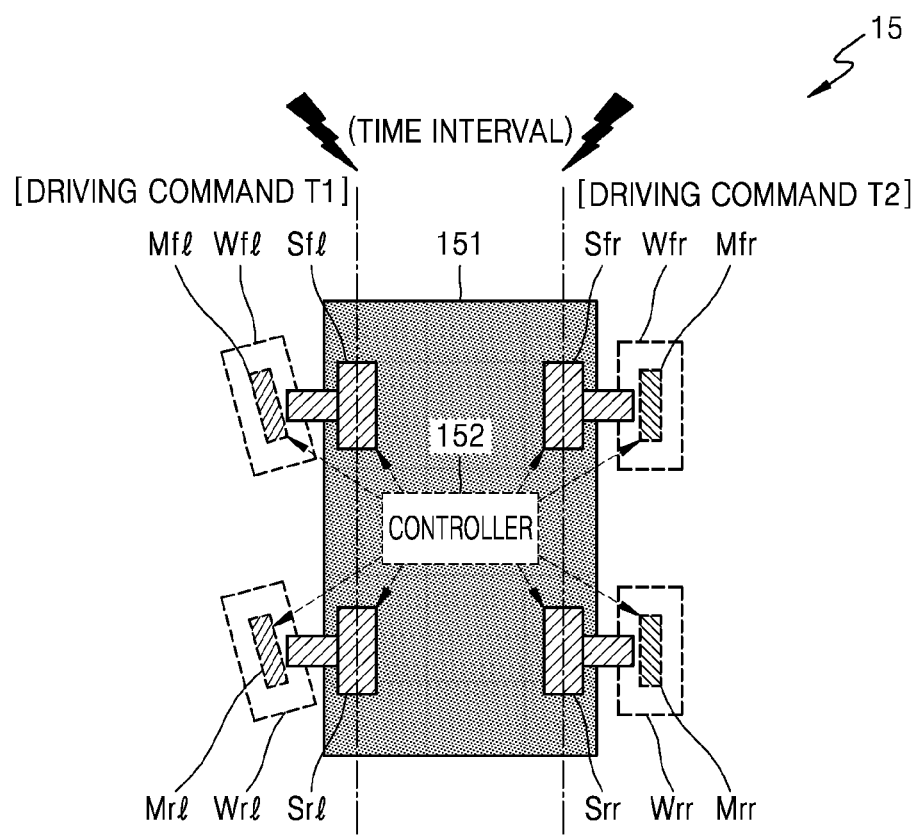
FIG. 21 illustrates a vehicle in which steering in the left direction is performed in the efficient steering operation shown in FIG. 16.

FIG. 21 illustrates a vehicle 15 in which a steering in the left direction is performed in efficient steering operation S167 shown in FIG. 16. Like reference numerals in FIGS. 15 and 21 indicate elements having the same functions.

Referring to FIG. 21, in the efficient steering operation S167, a controller 152 generates a control driving command and inputs the control driving command to steering devices Sfl and Srl and rotational force generating devices Mfl and Mrl for left wheels Wfl and Wrl at point in time T1.

Next, at a point in time T2 after a set time interval, e.g., a set time interval of 14 ms lapses, the controller 152 generates a control driving command and inputs the control driving command to steering devices Sfr and Srr and rotational force generating devices Mfr and Mrr for right wheels Wfr and Wrr.

Thus, since a steering angle and a rotational speed of the right wheels Wfr and Wrr may be further adaptively set according to a current steering angle of the vehicle 15 at the point in time T2, further efficient steering in the left direction may be performed by adapting to smooth road conditions.

Figure 22:
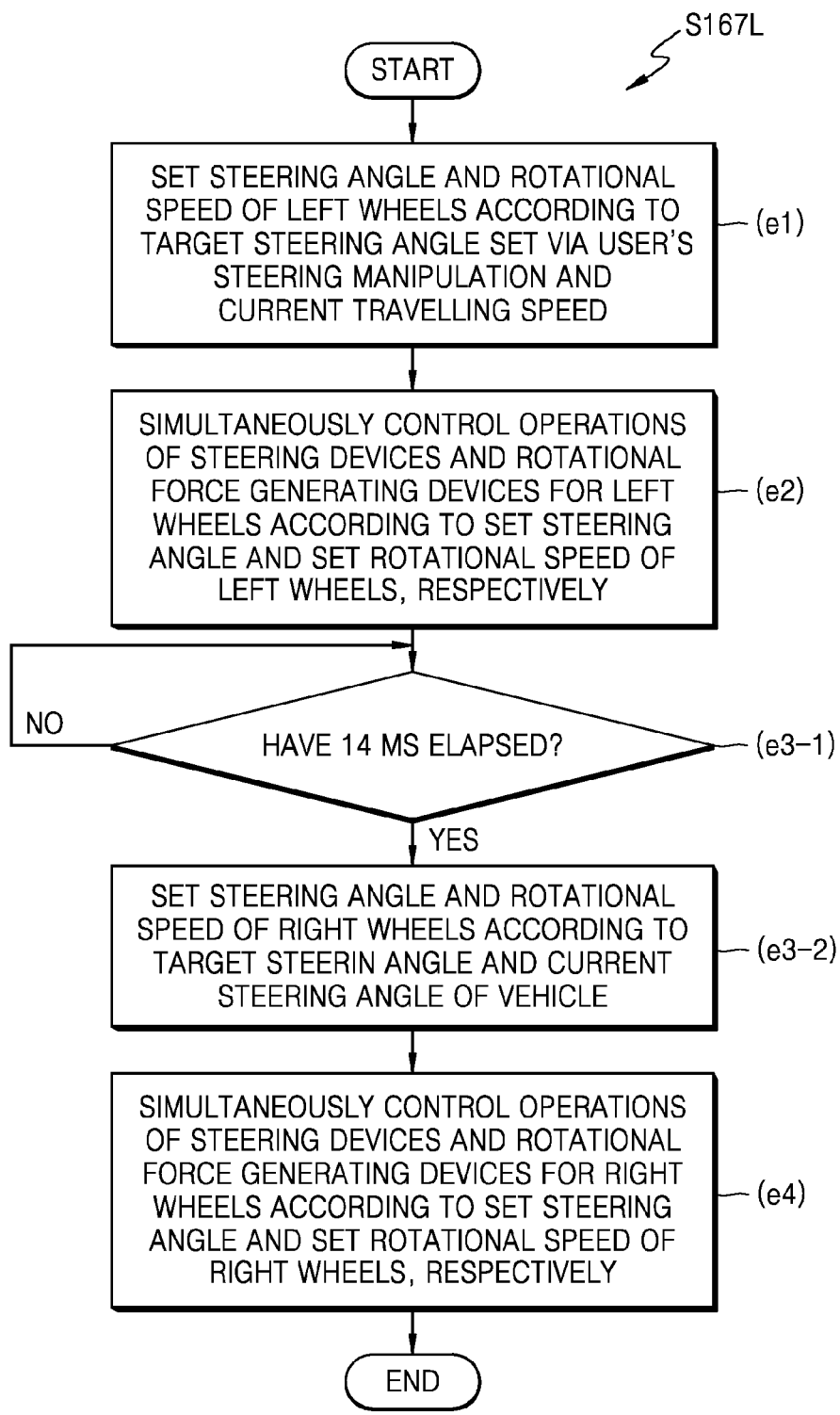
FIG. 22 is a flowchart of a detailed process of operation of performing steering in the left direction in the efficient steering operation shown in FIG. 16.
Figure 23:
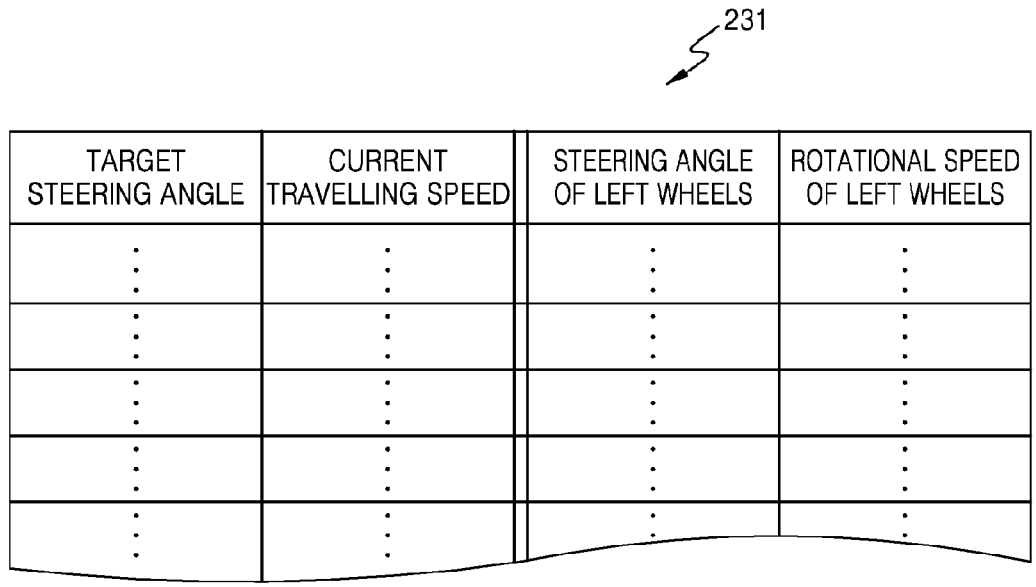
FIG. 23 illustrates an example of a LUT for performing operation e1 shown in FIG. 22.
Figure 24:
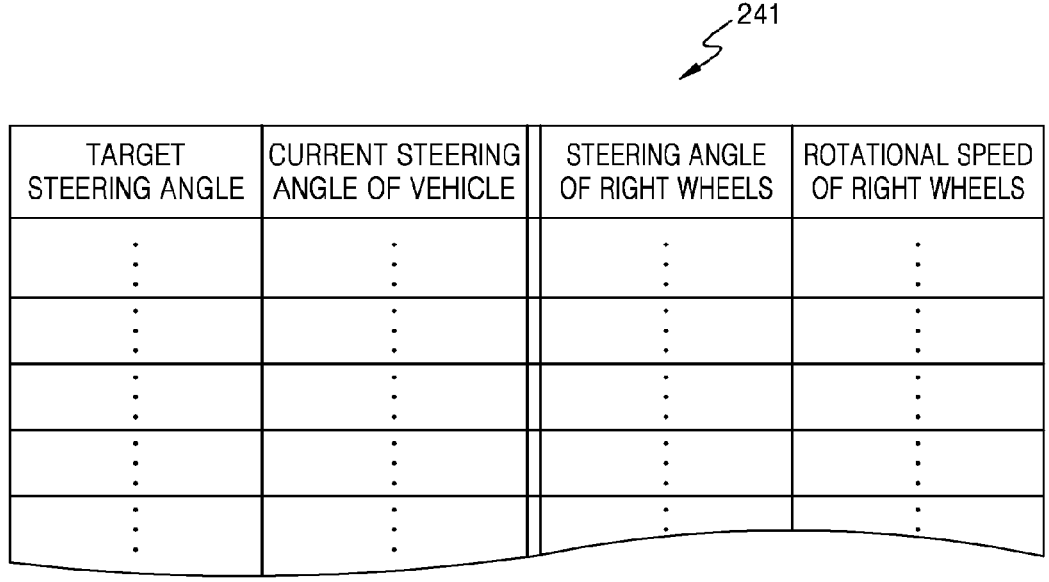
FIG. 24 illustrates an example of a LUT for performing operation e3-2 shown in FIG. 22.

FIG. 22 is a flowchart of a detailed process of operation S167L of performing steering in the left direction in the efficient steering operation S167 shown in FIG. 16, and FIG. 23 illustrates an example of a LUT 231 for performing operation e1 shown in FIG. 22. FIG. 24 illustrates an example of a LUT 241 for performing operation e3-2 shown in FIG. 22.

The detailed process of operation S167L of performing steering in the left direction in the efficient steering operation S167 will now be described in detail with reference to FIGS. 21 through 24.

First, the controller 152 reads the LUT 231 and sets a steering angle and a rotational speed of the left wheels Wfl and Wrl in accordance with a target steering angle set via user's manipulation of steering and a current travelling speed (operation e1).

Then, the controller 152 controls an operation of the steering devices Sfl and Srl for the left wheels Wfl and Wrl according to the set steering angle of the left wheels Wfl and Wrl while simultaneously controlling operation of the rotational force generating devices Mfl and Mrl for the left wheels Wfl and Wrl according to the set rotational speed of the left wheels Wfl and Wrl (operation e2).

Next, after a lapse of a set time of 14 ms from the point in time T1 when control of operations of the steering device Sfl and Srl and the rotational force generating devices Mfl and Mrl for the left wheels Wfl and Wrl starts (operation e3-1), the controller 152 reads the LUT 241 and sets a steering angle and a rotational speed of the right wheels Wfr and Wrr in accordance with a target steering angle and a current steering angle of the vehicle 15 (operation e3-2).

Thus, the steering angle and the rotational speed of the right wheels Wfr and Wrr may be further adaptively set according to the target steering angle and the current steering angle of the vehicle 15.

Thereafter, the controller 152 simultaneously controls operations of the steering devices Sfr and Srr and the rotational force generating devices Mfr and Mrr for the right wheels Wfr and Wrr according to the set steering angle and the set rotational speed of the right wheels Wfr and Wrr, respectively (operation e4).

Figure 25:
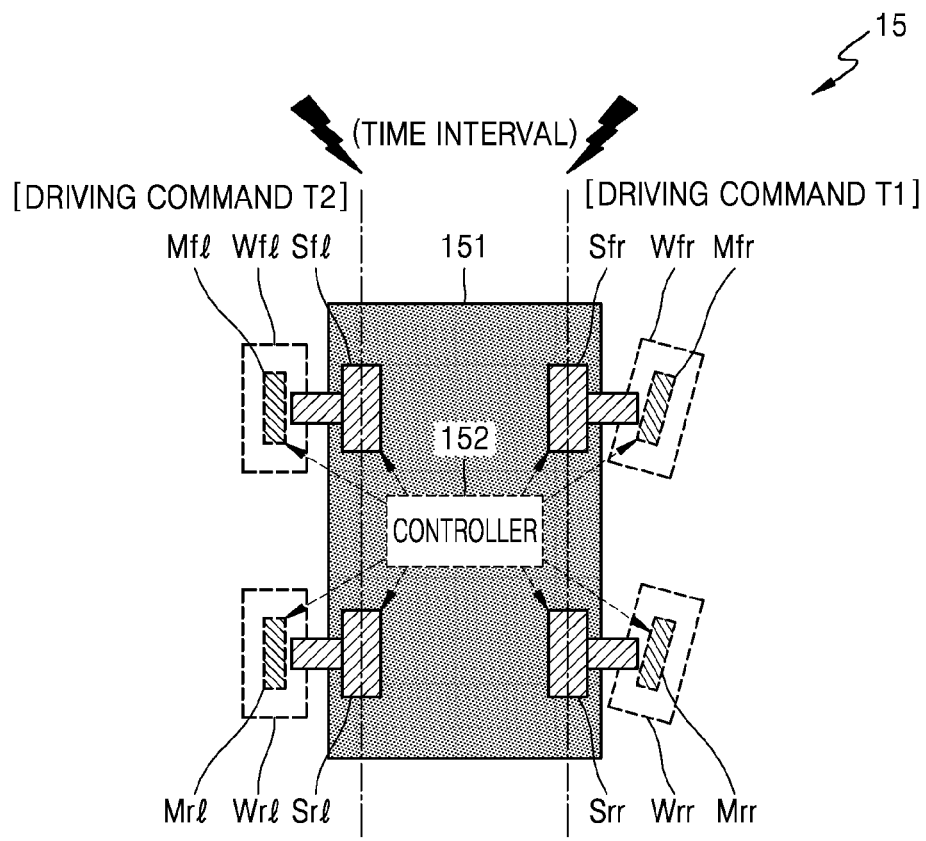
FIG. 25 illustrates a vehicle in which steering in the right direction is performed in the efficient steering operation shown in FIG. 16.

FIG. 25 illustrates a vehicle 15 in which steering in the right direction is performed in the efficient steering operation S167 shown in FIG. 16. Like reference numerals in FIGS. 15 and 25 indicate elements having the same functions.

Referring to FIG. 25, in the efficient steering operation S167, a controller 152 generates a control driving command and inputs the control driving command to steering devices Sfr and Srr and rotational force generating devices Mfr and Mrr for right wheels Wfr and Wrr at point in time T1.

Next, at a point in time T2 after a set time interval, e.g., a set time interval of 14 ms lapses, the controller 152 generates a control driving command and inputs the control driving command to steering devices Sfl and Srl and rotational force generating devices Mfl and Mrl for left wheels Wfl and Wrl.

Thus, since a steering angle and a rotational speed of the left wheels Wfl and Wrl may be further adaptively set according to a current steering angle of the vehicle 15 at the point in time T2, further efficient steering in the right direction may be performed by adapting to smooth road conditions.

Figure 26:
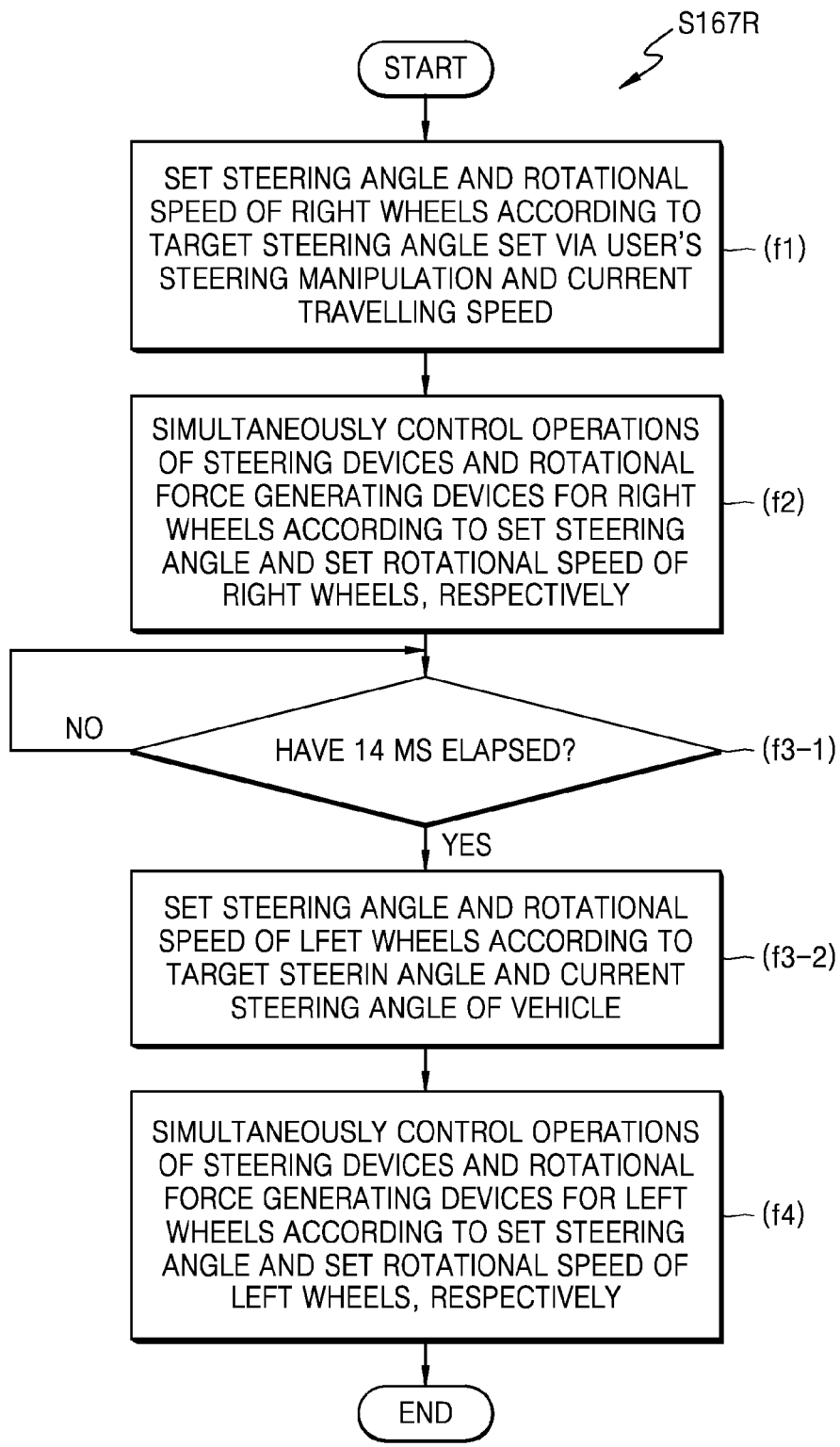
FIG. 26 is a flowchart of a detailed process of operation of performing steering in the right direction in the efficient steering operation shown in FIG. 16.
Figure 27:
FIG. 27 illustrates an example of a LUT for performing operation f1 shown in FIG. 26.
Figure 28:
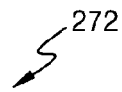
FIG. 28 illustrates an example of a LUT for performing operation f3-2 shown in FIG. 26.

FIG. 26 is a flowchart of a detailed process of operation S167R of performing steering in the right direction in the efficient steering operation S167 shown in FIG. 16, and FIG. 27 illustrates an example of a LUT 271 for performing operation f1 shown in FIG. 26. FIG. 28 illustrates an example of a LUT 272 for performing operation f3-2 shown in FIG. 26.

The detailed process of operation S167R of performing steering in the right direction in the efficient steering operation S167 will now be described in detail with reference to FIGS. 25 through 28.

First, the controller 152 reads the LUT 271 and sets a steering angle and a rotational speed of the right wheels Wfr and Wrr in accordance with a target steering angle set via user's manipulation of steering and a current travelling speed (operation f1).

Then, the controller 152 controls an operation of the steering devices Sfr and Srr for the right wheels Wfr and Wrr according to the set steering angle of the right wheels Wfr and Wrr while simultaneously controlling an operation of the rotational force generating devices Mfr and Mrr for the right wheels Wfr and Wrr according to the set rotational speed of the right wheels Wfr and Wrr (operation f2).

Next, after a lapse of a set time of 14 ms from the point in time T1 when control of operations of the steering device Sfr and Srr and the rotational force generating devices Mfr and Mrr for the right wheels Wfr and Wrr starts (operation f3-1), the controller 152 reads the LUT 272 and sets a steering angle and a rotational speed of the left wheels Wfl and Wrl in accordance with a target steering angle and a current steering angle of the vehicle 15 (operation f3-2).

Thus, the steering angle and rotational speed of the left wheels Wfl and Wrl may be further adaptively set according to the target steering angle and the current steering angle of the vehicle 15.

Thereafter, the controller 152 simultaneously controls operations of the steering devices Sfl and Srl and the rotational force generating devices Mfl and Mrl for the left wheels Wfl and Wrl according to the set steering angle and the set rotational speed of the left wheels Wfl and Wrl, respectively (operation f4).

Figure 29:
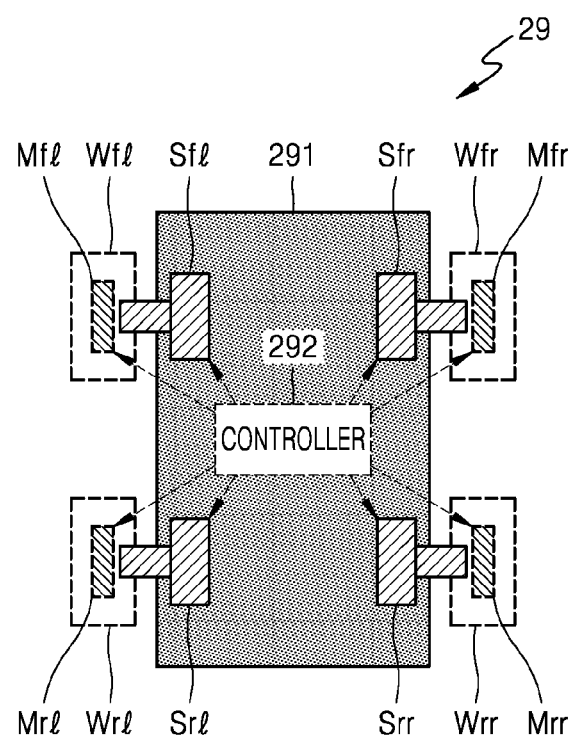
FIG. 29 illustrates a vehicle according to another exemplary embodiment.

FIG. 29 illustrates a vehicle 29 according to another exemplary embodiment. Reference numeral 291 denotes a vehicle body.

Referring to FIG. 29, the vehicle 29 according to the present exemplary embodiment includes individual steering devices Sfl, Sfr, Srl, and Srr and individual rotational force generating devices Mfl, Mfr, Mrl, and Mrr, e.g., individual motors, for respective wheels Wfl, Wfr, Wrl, and Wrr.

According to a method of controlling the vehicle 29 according to another exemplary embodiment, a controller 292 controls the steering devices Sfl, Sfr, Srl, and Srr and the rotational force generating devices Mfl, Mfr, Mrl, and Mrr in response to electrical control signals generated according to a user's command. In this case, a user may select a stable steering mode or an efficient steering mode according to road conditions.

In a speed acceleration mode, the controller 292 controls operation of the rotational force generating devices Mfl, Mfr, Mrl, and Mrr by making a point in time when control of the front wheels Wfl and Wfr starts different from that when control of the rear wheels Wrl and Wrr starts.

For example, after a lapse of a set time from a point in time when control of operation of the rotational force generating devices Mfl and Mfr for the front wheels Wfl and Wfr starts, a rotational speed of the rear wheels Wrl and Wrr is set according to a user's target speed and a current speed of the vehicle 29. The set time may be 10 ms to 1,500 ms. According to the present exemplary embodiment, the set time is 250 ms.

Thus, since the rotational speed of the rear wheels Wrl and Wrr may be further adaptively set according to the current speed of the vehicle 29, further stable speed acceleration may be performed by adapting to various road conditions. For example, it is possible to prevent vehicle roll-over during an initial phase of the speed acceleration.

In a braking mode, the controller 292 may control operation of the rotational force generating devices Mfl, Mfr, Mrl, and Mrr by making a point in time by making a point in time when control of wheels Wfl and Wrr on a first diagonal line starts different from that when control of wheels Wfr and Wrl on a second diagonal line starts.

For example, after a lapse of a set time of 250 ms from a point in time when control of operation of the rotational force generating devices Mfl and Mrr for the wheels Wfl and Wrr on the first diagonal line starts, a rotational speed of the wheels Wfr and Wrl on the second diagonal line may be set according to a user's target speed and a current speed of the vehicle 29.

Thus, since the rotational speed of the wheels Wfr and Wrl on the second diagonal line may be further adaptively set according to the current speed of the vehicle 29, efficient braking may be performed by adapting to various road conditions.

Briefly, according to the method of controlling the vehicle 29 and the vehicle 29 adopting the method according to the present exemplary embodiments, the vehicle 29 may be driven adaptively according to various road conditions.

Figure 30:
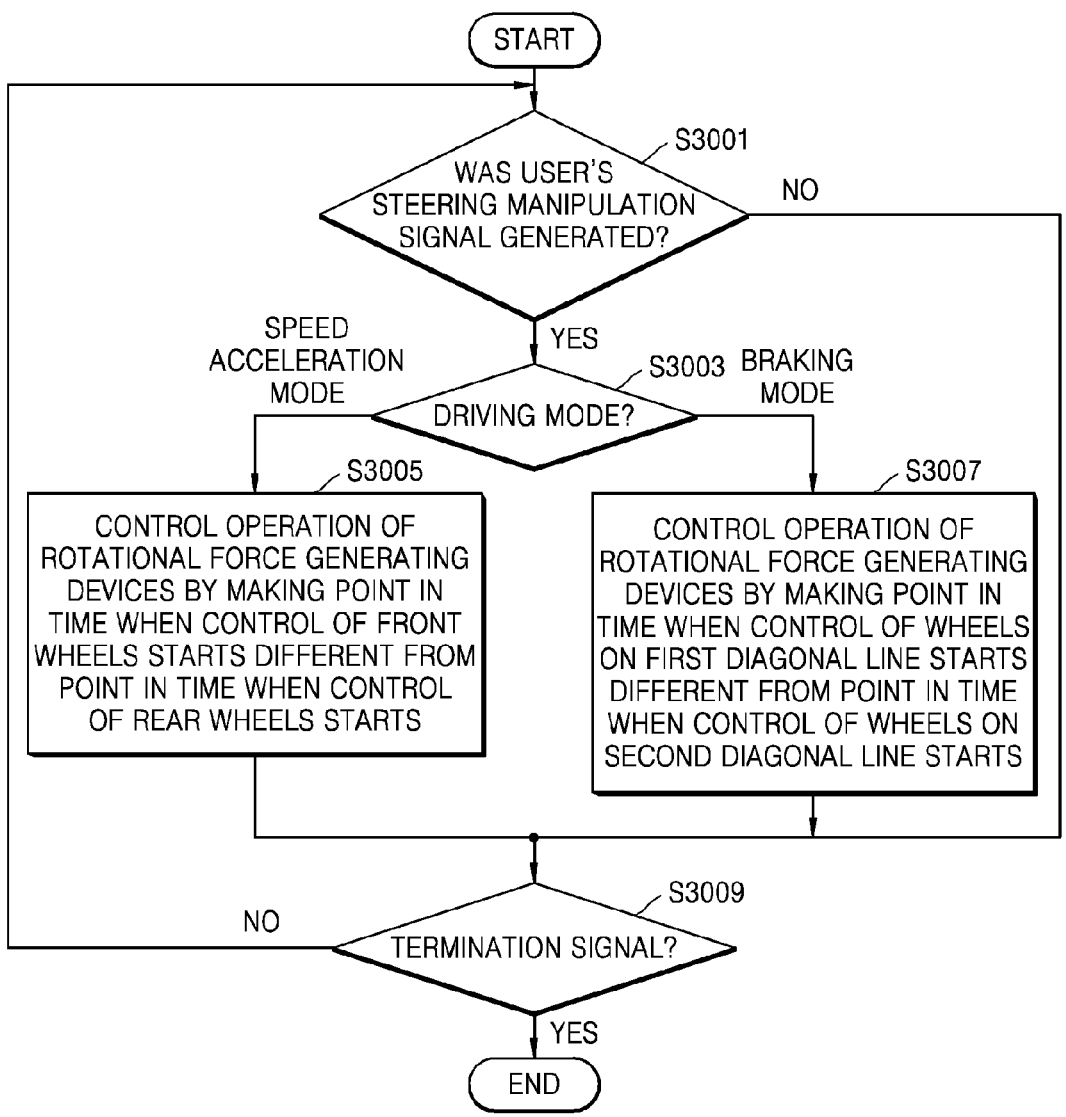
FIG. 30 is a flowchart of a method of controlling a vehicle, which is performed by a controller shown in FIG. 29.

FIG. 30 is a flowchart of a method of controlling the vehicle 29, which is performed by the controller 292 shown in FIG. 29. The method of controlling the vehicle 29 according to the present exemplary embodiment will now be described with reference to FIGS. 29 and 30.

If a steering manipulation signal is generated as a user's command signal (S3001), the controller 292 determines the type of a current driving mode (S3003).

If the current driving mode is a speed acceleration mode, the controller 292 controls operations of the steering devices Sfl, Sfr, Srl, Srr and the rotational force generating devices Mfl, Mfr, Mrl, and Mrr by making a point in time when control of the front wheels Wfl and Wfr starts different from that when control of the rear wheels Wrl and Wrr starts (S3005).

If the current steering mode is a braking mode, the controller 292 controls operation of the rotational force generating devices Mfl, Mfr, Mrl, and Mrr by making a point in time when control of the wheels Wfl and Wrr on the first diagonal line starts different from that when control of the wheels Wfr and Wrl on the second diagonal line starts (S3007).

The above-described operations S3001, S3003, S3005, and S3007 are repeatedly performed until a termination signal is generated (S3009).

Figure 31:
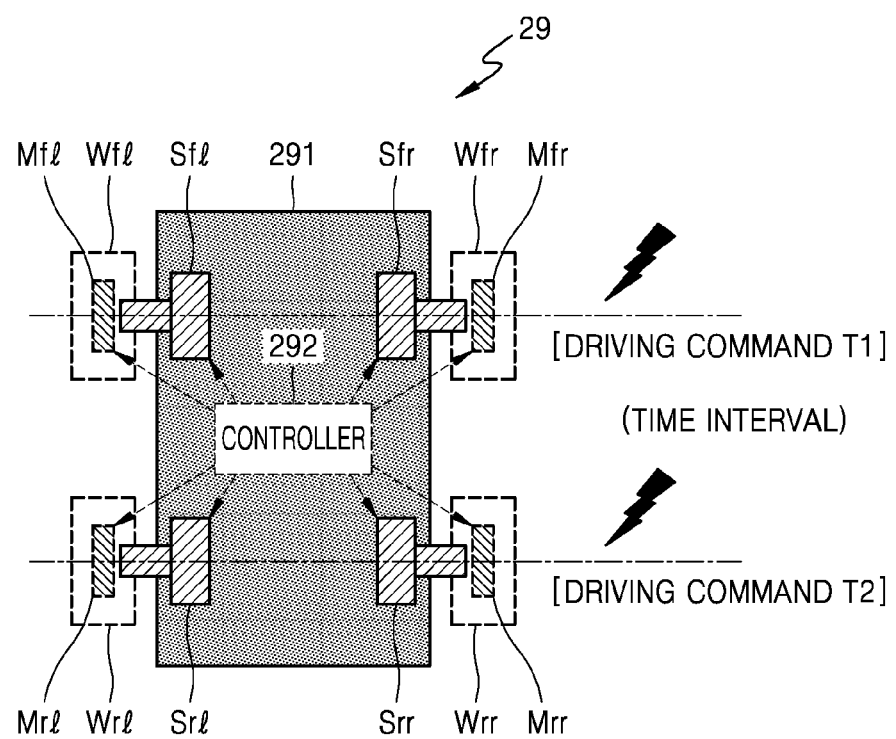
FIG. 31 illustrates a vehicle in which speed acceleration operation shown in FIG. 30 is performed.

FIG. 31 illustrates a vehicle 29 in which the speed acceleration operation S3005 shown in FIG. 30 is performed. Like reference numerals in FIGS. 29 and 31 indicate elements having the same functions.

Referring to FIG. 31, in the speed acceleration operation S3005, a controller 292 generates a control driving command and inputs the control driving command to rotational force generating devices Mfl and Mfr for front wheels Wfl and Wfr at point in time T1.

Next, at a point in time T2 after a set time interval, e.g., a set time interval of 250 ms lapses, the controller 292 generates a control driving command and inputs the control driving command to rotational force generating devices Mrl and Mrr for rear wheels Wrl and Wrr.

Thus, since a rotational speed of the rear wheels Wrl and Wrr may be further adaptively set according to a current speed of the vehicle 29 at the point in time T2, further stable speed acceleration may be performed by adapting to various road conditions. For example, occurrence of vehicle roll-over during an initial phase of the speed acceleration may be prevented.

Figure 32:
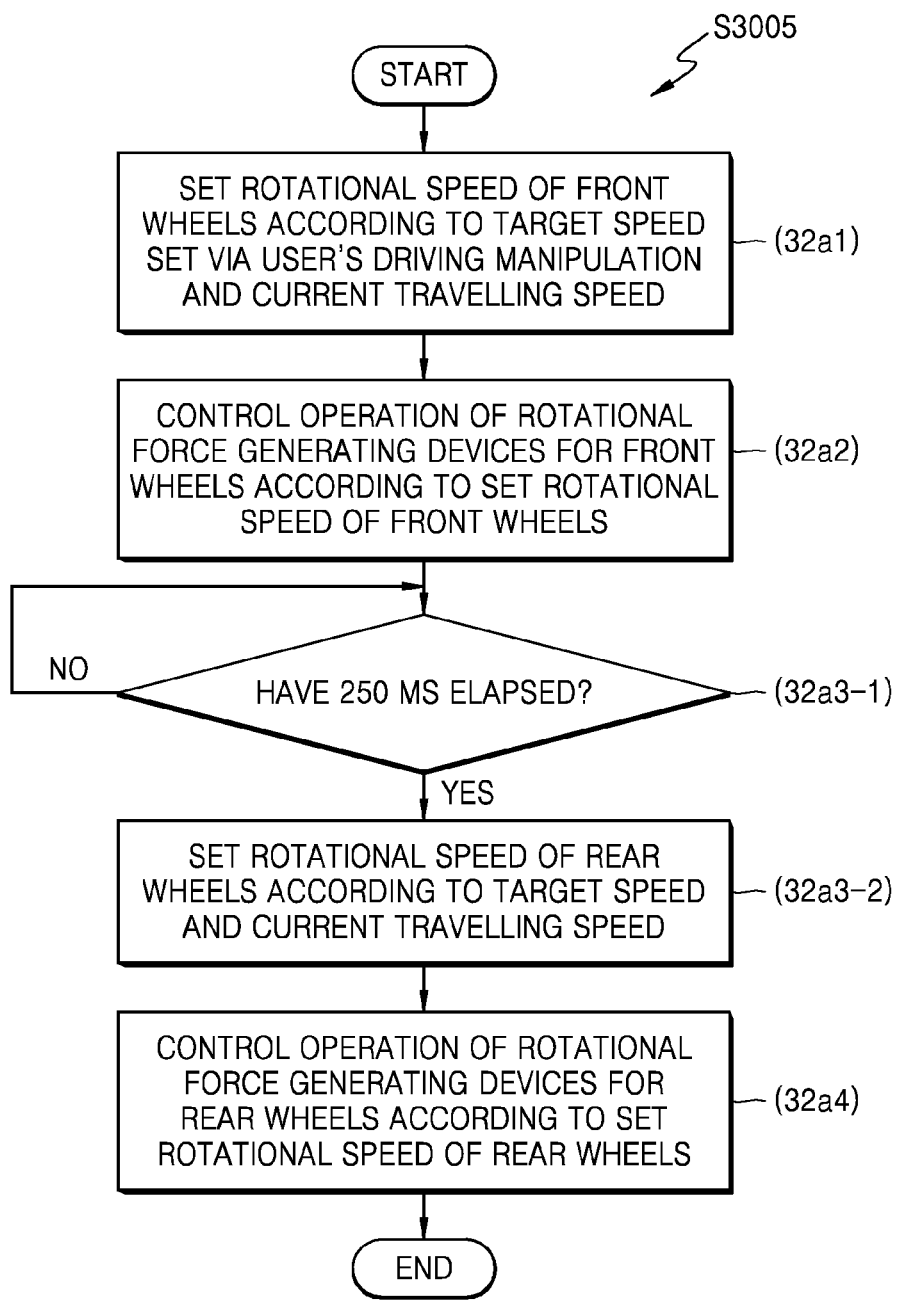
FIG. 32 is a flowchart of a detailed process of speed acceleration operation shown in FIG. 30.
Figure 33:
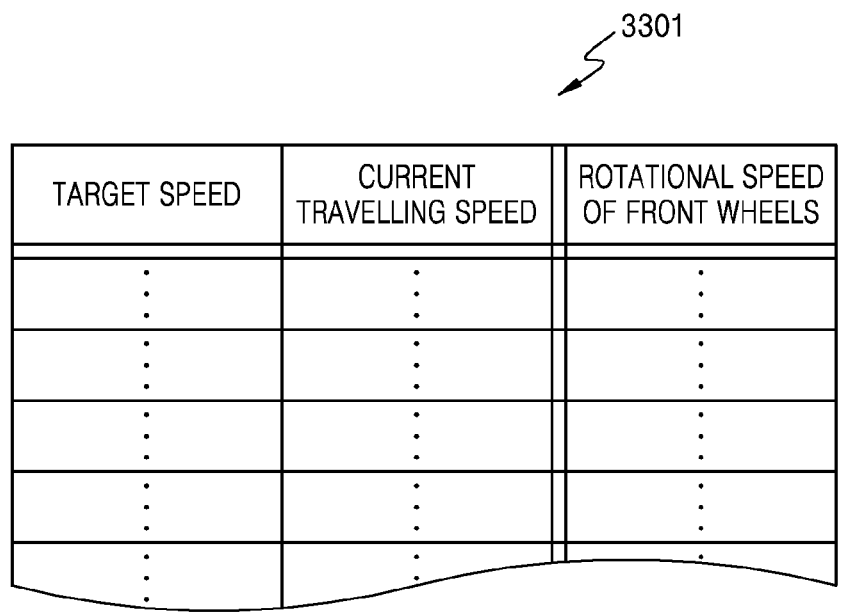
FIG. 33 illustrates an example of a LUT for performing operation $32a1$ shown in FIG. 32.
Figure 34:
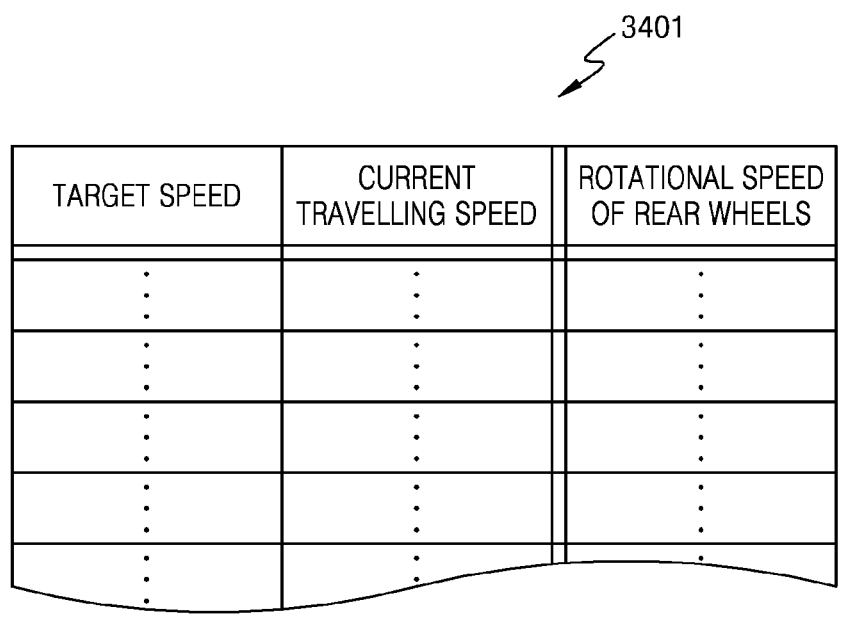
FIG. 34 illustrates an example of a LUT for performing operation $32a3$-2 shown in FIG. 32.

FIG. 32 is a flowchart of a detailed process of the speed acceleration operation S3005 shown in FIG. 30, and FIG. 33 illustrates an example of a LUT 3301 for performing operation 32a1 shown in FIG. 32. FIG. 34 illustrates an example of a LUT 3401 for performing operation 32a3-2 shown in FIG. 32.

The detailed process of the speed acceleration operation S3005 shown in FIG. 30 will now be described with reference to FIGS. 32 through 34.

First, the controller 292 reads the LUT 3301 and sets a rotational speed of the front wheels Wfl and Wfr in accordance with a target speed set via a user's driving manipulation and a current travelling speed (operation 32a1).

Then, the controller 292 controls an operation of the rotational force generating devices Mfl and Mfr for the front wheels Wfl and Wfr according to the set rotational speed of the front wheels Wfl and Wfr (operation 32a2)

Next, after a lapse of a set time of 250 ms from point in time T1 when control of operation of the rotational force generating devices Mfl and Mfr for the front wheels Wfl and Wfr starts (operation 32a3-1), the controller 292 reads the LUT 3401 and sets a rotational speed of the rear wheels Wrl and Wrr in accordance with a target speed and a current travelling speed (operation 32a3-2).

Thus, the rotational speed of the rear wheels Wrl and Wrr may be further adaptively set according to the target speed and the current speed of the vehicle 29.

Thereafter, the controller 292 controls an operation of the rotational force generating devices Mrl and Mrr for the rear wheels Wrl and Wrr according to the set rotational speed of the rear wheels Wrl and Wrr (operation 32a4).

Figure 35:
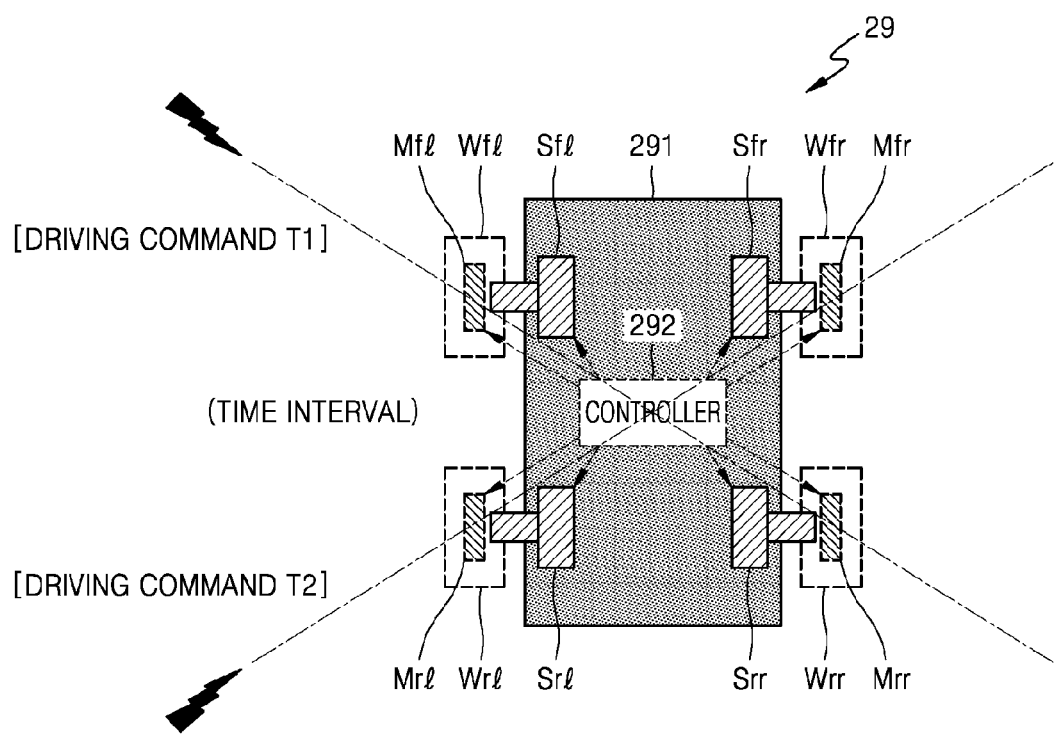
FIG. 35 illustrates a vehicle in which a braking operation shown in FIG. 30 is performed.

FIG. 35 illustrates a vehicle 29 in which the braking operation S3007 shown in FIG. 30 is performed. Like reference numerals in FIGS. 29 and 31 indicate elements having the same functions.

Referring to FIG. 35, in the braking operation S3007, the controller 292 generates a control driving command and inputs the control driving command to rotational force generating devices Mfl and Mrr for wheels Wfl and Wrr on a first diagonal line at point in time T1.

Next, at a point in time T2 after a set time interval, e.g., a set time interval of 250 ms lapses, the controller 292 generates a control driving command and inputs the control driving command to rotational force generating devices Mrl and Mfr for wheels Wrl and Wfr on a second diagonal line.

Thus, since a rotational speed of the wheels Wrl and Wfr on a second diagonal line may be further adaptively set according to a current speed of the vehicle 29 at the point in time T2, efficient braking may be performed by adapting to various road conditions.

Figure 36:
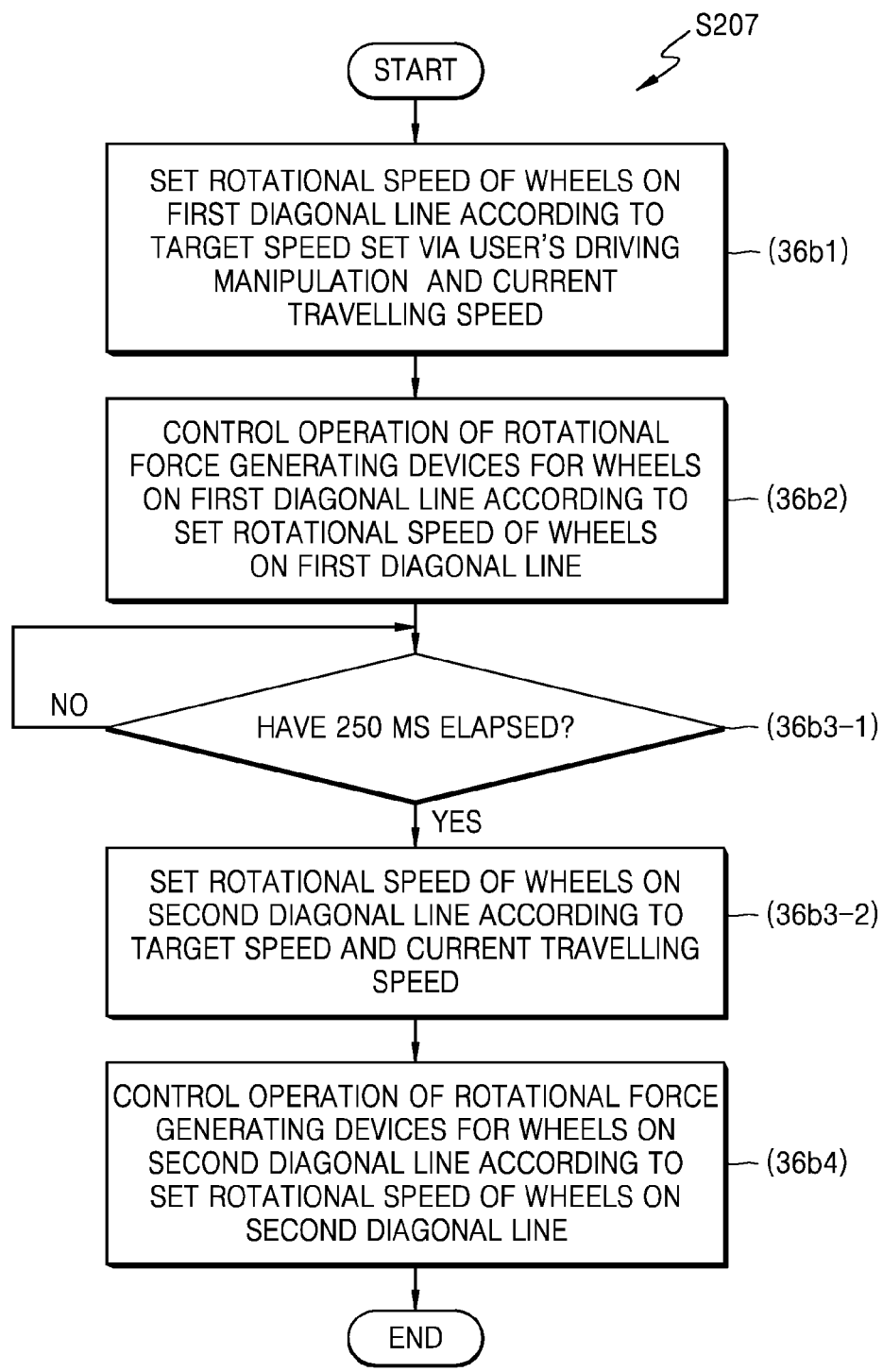
FIG. 36 is a flowchart of a detailed process of the braking operation shown in FIG. 30.
Figure 37:
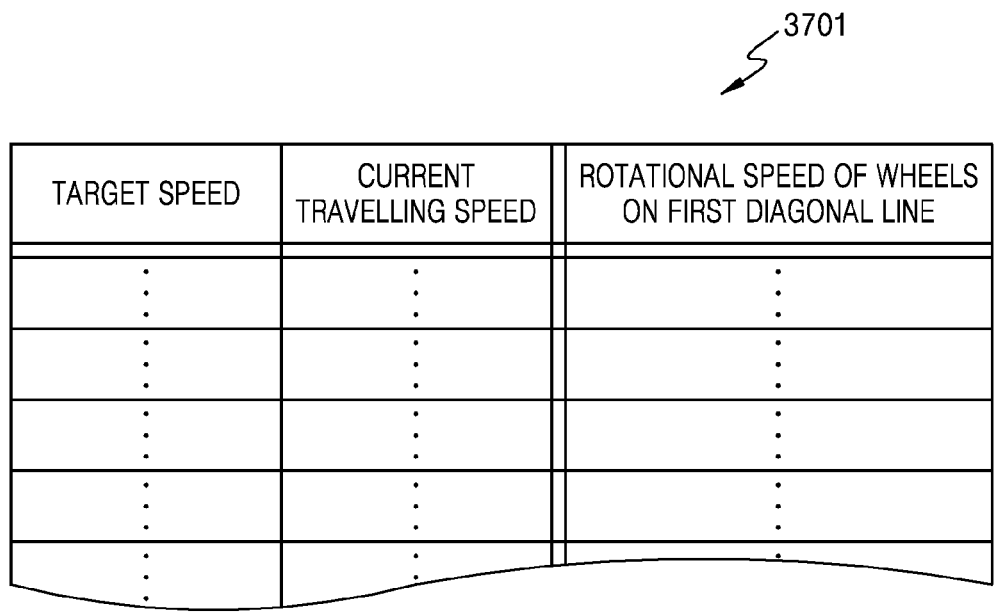
FIG. 37 illustrates an example of a LUT for performing operation $36b1$ shown in FIG. 36.
Figure 38:
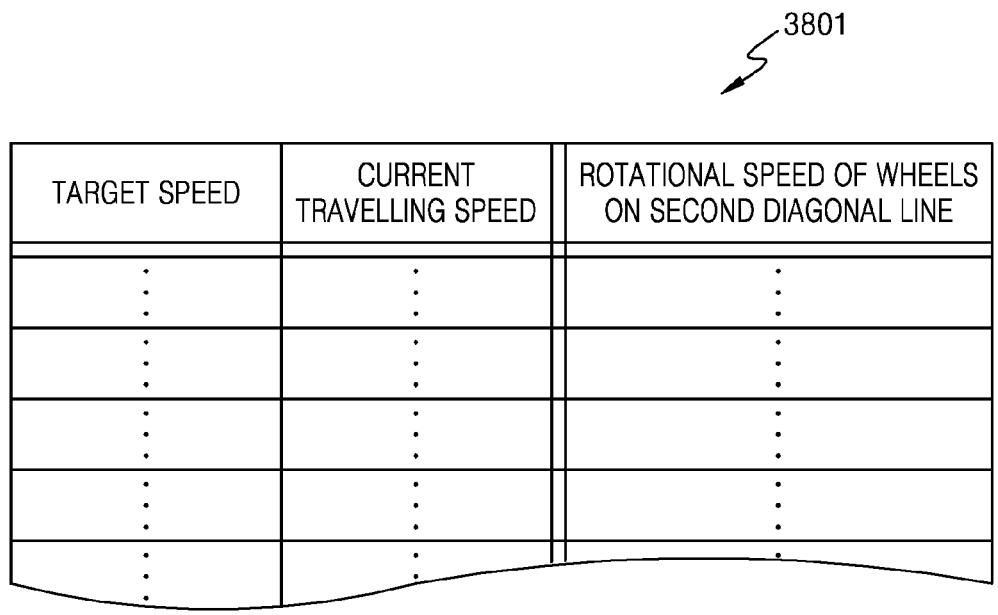
FIG. 38 illustrates an example of a LUT for performing operation $36b3$-2 shown in FIG. 36.

FIG. 36 is a flowchart of a detailed process of the braking operation S3007 shown in FIG. 30, and FIG. 37 illustrates an example of a LUT 3701 for performing operation 36b1 shown in FIG. 36. FIG. 38 illustrates an example of a LUT 3801 for performing operation 36b3-2 shown in FIG. 36.

The detailed process of the braking operation S3007 will now be described in detail with reference to FIGS. 36 through 38.

First, the controller 292 reads the LUT 3701 and sets a rotational speed of the wheels Wfl and Wrr on the first diagonal line in accordance with a target speed set via a user's driving manipulation and a current travelling speed (operation 36b1).

Then, the controller 292 controls an operation of the rotational force generating devices Mfl and Mrr for the wheels Wfl and Wrr on the first diagonal line according to the set rotational speed of the wheels Wfl and Wrr on the first diagonal line (operation 36b2).

Next, after a lapse of a set time of 250 ms from the point in time T1 when control of operation of the rotational force generating devices Mfl and Mrr starts (operation 36b3-1), the controller 292 reads the LUT 3801 and sets a rotational speed of the wheels Wrl and Wfr on the second diagonal line in accordance with a target speed and a current travelling speed of the vehicle 29 (operation 36b3-2).

Thus, the rotational speed of the wheels Wrl and Wfr on the second diagonal line may be further adaptively set according to the target speed and the current speed of the vehicle 29.

Thereafter, the controller 292 controls an operation of the rotational force generating devices Mrl and Mfr for the wheels Wrl and Wfr on the second diagonal line according to the set rotational speed of the wheels Wrl and Wfr on the second diagonal line (operation 36b4).

Figure 39:
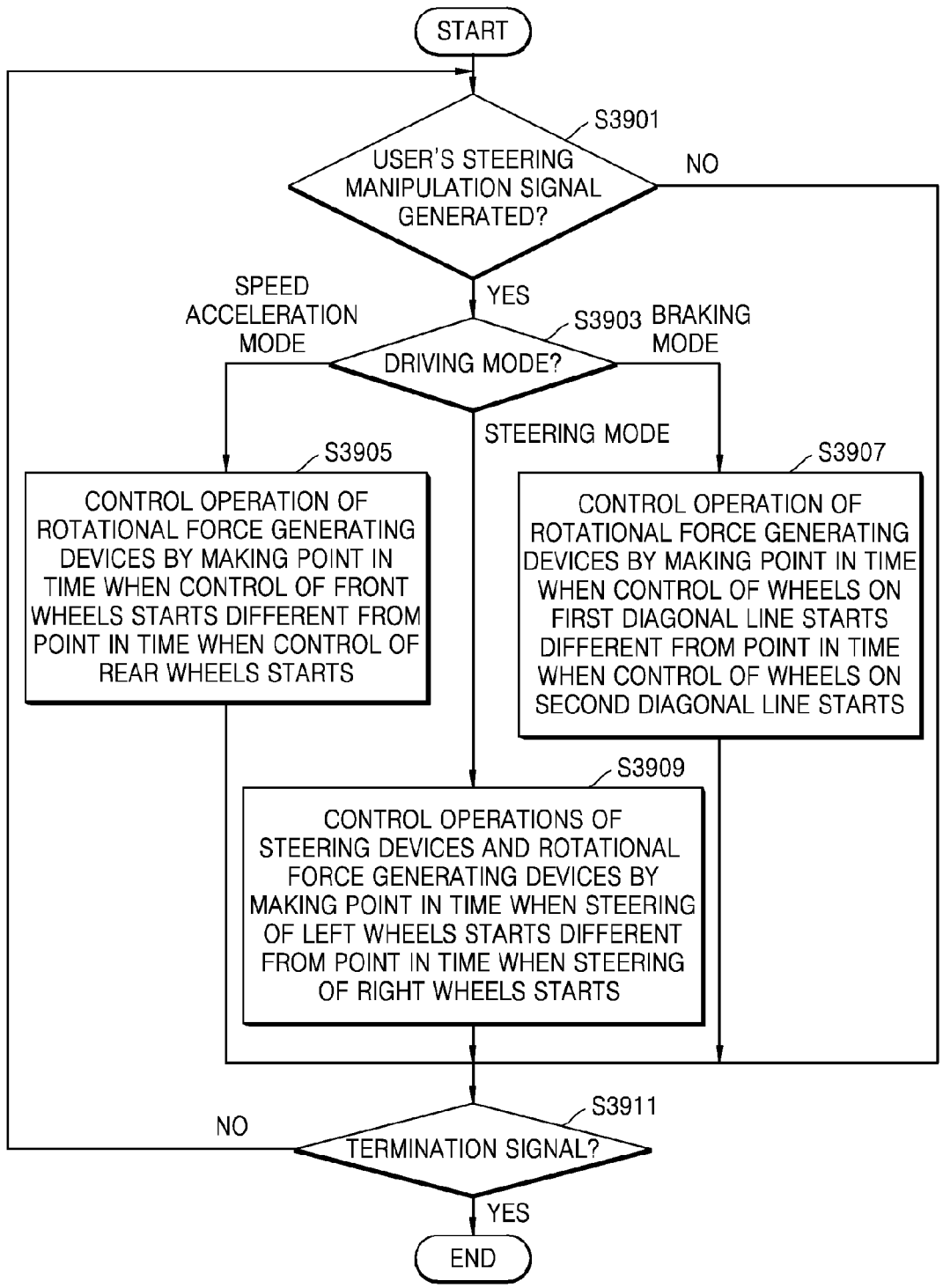
FIG. 39 is a flowchart of a method of controlling a vehicle according to another exemplary embodiment, which is performed by a controller shown in FIG. 29.

FIG. 39 is a flowchart of a method of controlling the vehicle 29 according to another exemplary embodiment, which is performed by the controller 292 shown in FIG. 29.

When the method of FIG. 39 is compared with the method of FIG. 30, operations S3901, S3903, S3905, S3907, and S3911 of the method of FIG. 39 correspond to operations S3001, S3003, S3005, S3007, and S3009 of the method of FIG. 30, respectively.

In other words, the method of FIG. 39 further includes operation S3909 in comparison to the method of FIG. 30.

Referring to FIGS. 29 and 39, in a steering operation S3909, the controller 292 controls operations of the steering devices Sfl, Sfr, Srl, and Srr and the rotational force generating devices Mfl, Mfr, Mrl, and Mrr by making a point in time when steering of the left wheels Wfl and Wrl starts different from that when steering of the right wheels Wfr and Wrr starts.

For example, if steering is performed in the left direction, after a lapse of a set time from a point in time when control of operations of the steering device Sfl and Srl and the rotational force generating devices Mfl and Mrl for the left wheels Wfl and Wrl starts, a steering angle and a rotational speed of the right wheels Wfr and Wrr are set in accordance with a user's target steering angle and a current steering angle.

Thus, since the steering angle and the rotational speed of the right wheels Wfr and Wrr may be further adaptively set according to the current steering angle of the vehicle 29, further efficient steering may be performed by adapting to various road conditions.

Figure 40:
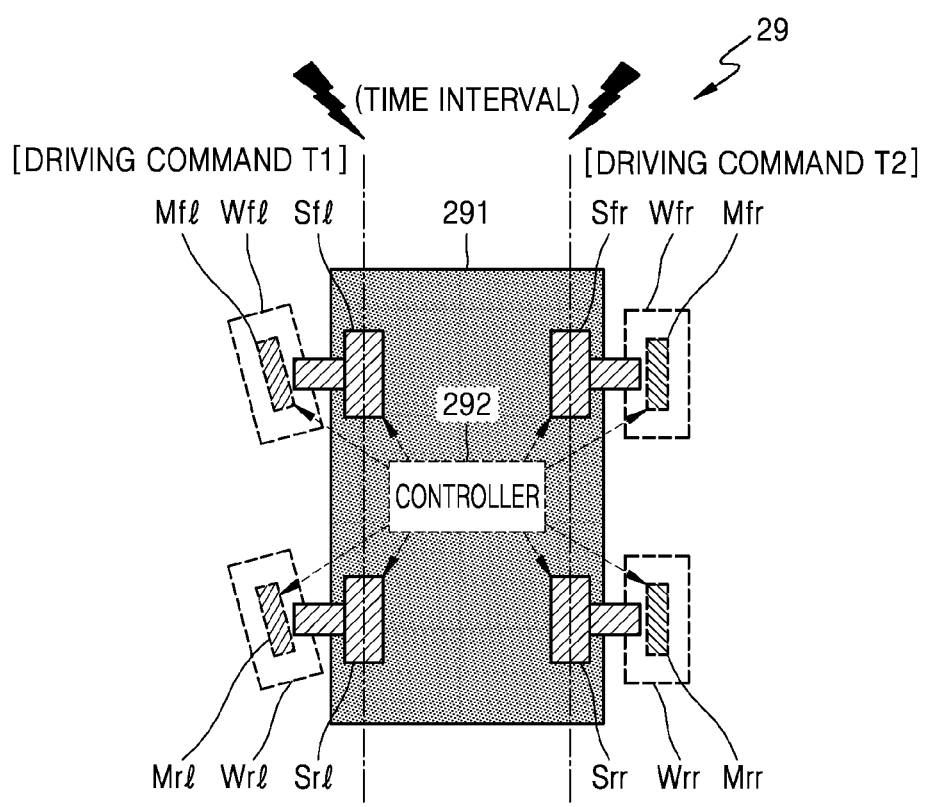
FIG. 40 illustrates a vehicle in which steering in the left direction is performed in steering operation shown in FIG. 39.

FIG. 40 illustrates a vehicle 29 in which steering in the left direction is performed in steering operation S3909 shown in FIG. 39. Like reference numerals in FIGS. 29 and 40 indicate elements having the same functions.

Referring to FIG. 40, in the steering operation S3909, a controller 292 generates a control driving command and inputs the control driving command to steering devices Sfl and Srl and rotational force generating devices Mfl and Mrl for left wheels Wfl and Wrl at point in time T1.

Next, at a point in time T2 after a set time interval, e.g., a set time interval of 250 ms lapses, the controller 292 generates a control driving command and inputs the control driving command to steering devices Sfr and Srr and rotational force generating devices Mfr and Mrr for right wheels Wfr and Wrr.

Thus, since a steering angle and a rotational speed of the right wheels Wfr and Wrr may be further adaptively set according to a current steering angle of the vehicle 29 at the point in time T2, further efficient steering may be performed by adapting to various road conditions.

Figure 41:
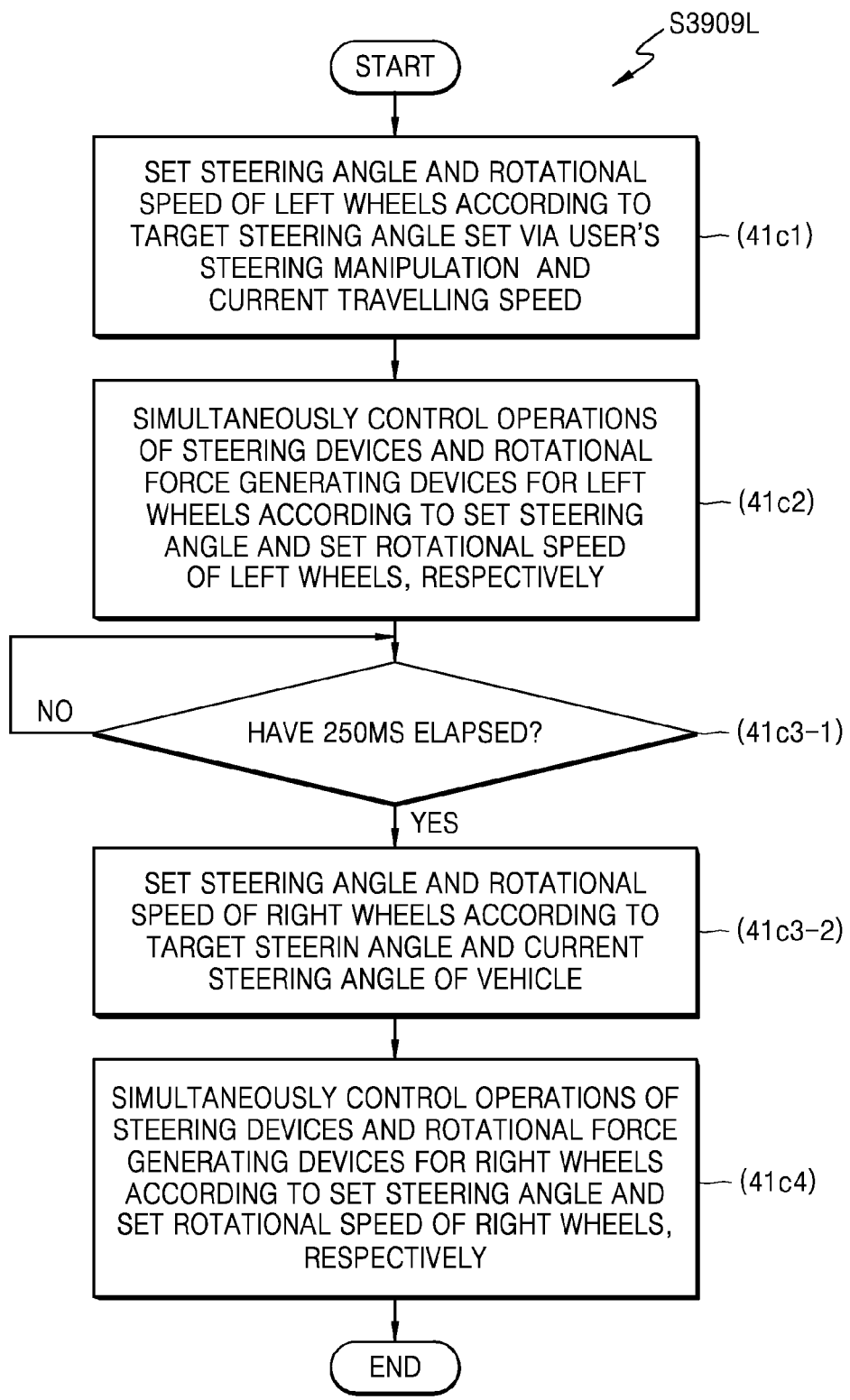
FIG. 41 is a flowchart of a detailed process of operation of performing steering in the left direction in the steering operation shown in FIG. 39.
Figure 42:
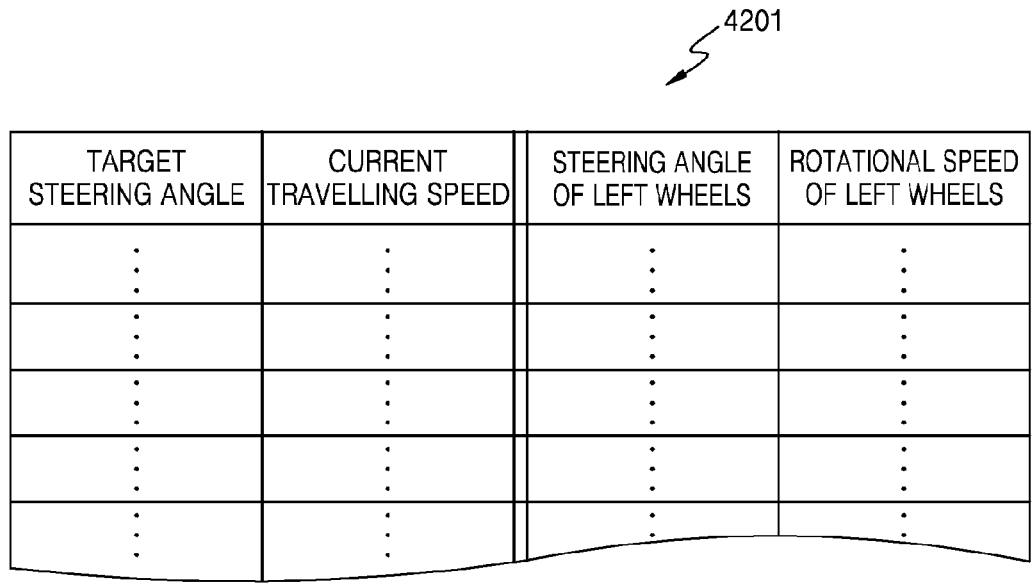
FIG. 42 illustrates an example of a LUT for performing operation $41c1$ shown in FIG. 41.
Figure 43:
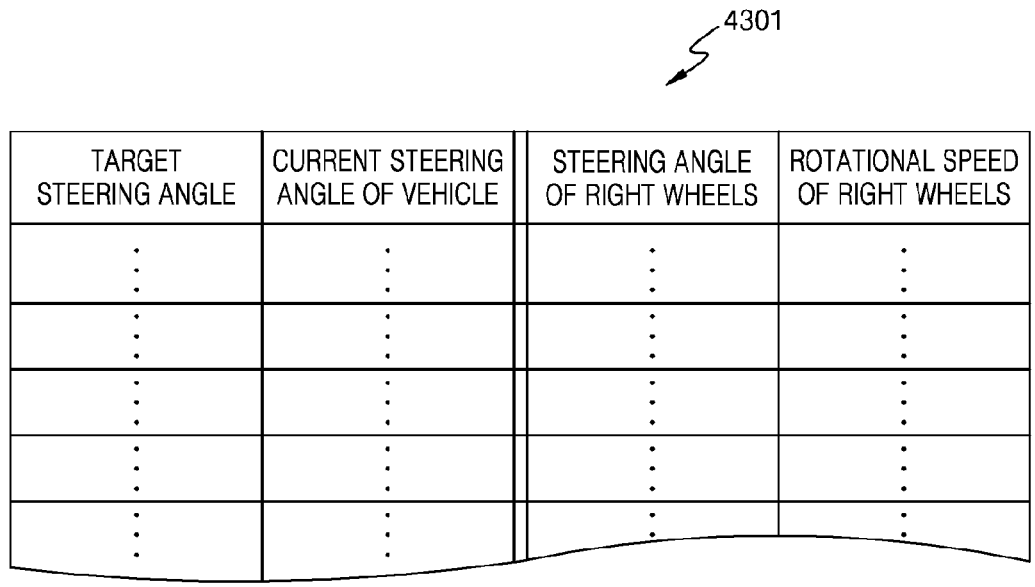
FIG. 43 illustrates an example of a LUT for performing operation $41c3$-2 shown in FIG. 41.

FIG. 41 is a flowchart of a detailed process of operation S3909L of performing steering in the left direction in the steering operation S3909 shown in FIG. 39, and FIG. 42 illustrates an example of a LUT 4201 for performing operation 41c1 shown in FIG. 41. FIG. 43 illustrates an example of a LUT 4301 for performing operation 41c3-2 shown in FIG. 41.

The detailed process of operation S3909L of performing steering in the left direction in the steering operation S3909 will now be described in detail with reference to FIGS. 40 through 43.

First, the controller 292 reads the LUT 4201 and sets a steering angle and a rotational speed of the left wheels Wfl and Wrl in accordance with a target steering angle set via a user's steering manipulation and a current travelling speed (operation 41c1).

Then, the controller 292 controls an operation of the steering devices Sfl and Srl for the left wheels Wfl and Wrl according to the set steering angle of the left wheels Wfl and Wrl while simultaneously controlling operation of the rotational force generating devices Mfl and Mrl for the left wheels Wfl and Wrl according to the set rotational speed of the left wheels Wfl and Wrl (operation 41c2).

Next, after a lapse of a set time of 250 ms from the point in time T1 when control of operations of the steering device Sfl and Srl and the rotational force generating devices Mfl and Mrl for the left wheels Wfl and Wrl starts (operation 41c3-1), the controller 292 reads the LUT 4301 and sets a steering angle and a rotational speed of the right wheels Wfr and Wrr in accordance with a target steering angle and a current steering angle of the vehicle 29 (operation 41c3-2).

Thus, the steering angle and the rotational speed of the right wheels Wfr and Wrr may be further adaptively set according to the target steering angle and the current steering angle of the vehicle 29.

Thereafter, the controller 292 simultaneously controls operations of the steering devices Sfr and Srr and the rotational force generating devices Mfr and Mrr for the right wheels Wfr and Wrr according to the set steering angle and the set rotational speed of the right wheels Wfr and Wrr, respectively (operation 41c4).

Figure 44:
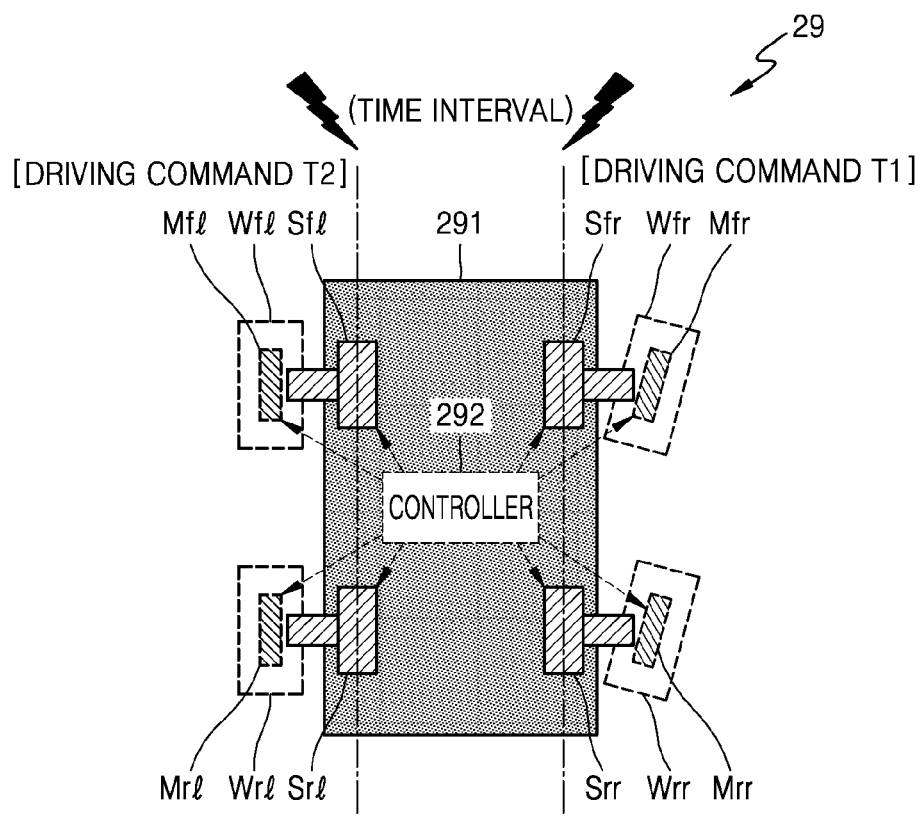
FIG. 44 illustrates a vehicle in which steering in the right direction is performed in the steering operation shown in FIG. 39

FIG. 44 illustrates a vehicle 29 in which steering in the right direction is performed in steering operation S3909 shown in FIG. 39. Like reference numerals in FIGS. 29 and 44 indicate elements having the same functions.

Referring to FIG. 44, in the steering operation S3909, a controller 292 generates a control driving command and inputs the control driving command to steering devices Sfr and Srr and rotational force generating devices Mfr and Mrr for right wheels Wfr and Wrr at point in time T1.

Next, at a point in time T2 after a set time interval, e.g., a set time interval of 250 ms lapses, the controller 292 generates a control driving command and inputs the control driving command to steering devices Sfl and Srl and rotational force generating devices Mfl and Mrl for left wheels Wfl and Wrl.

Thus, since a steering angle and a rotational speed of the left wheels Wfl and Wrl may be further adaptively set according to a current steering angle of the vehicle 29 at the point in time T2, further efficient steering may be performed by adapting to various road conditions.

Figure 45:
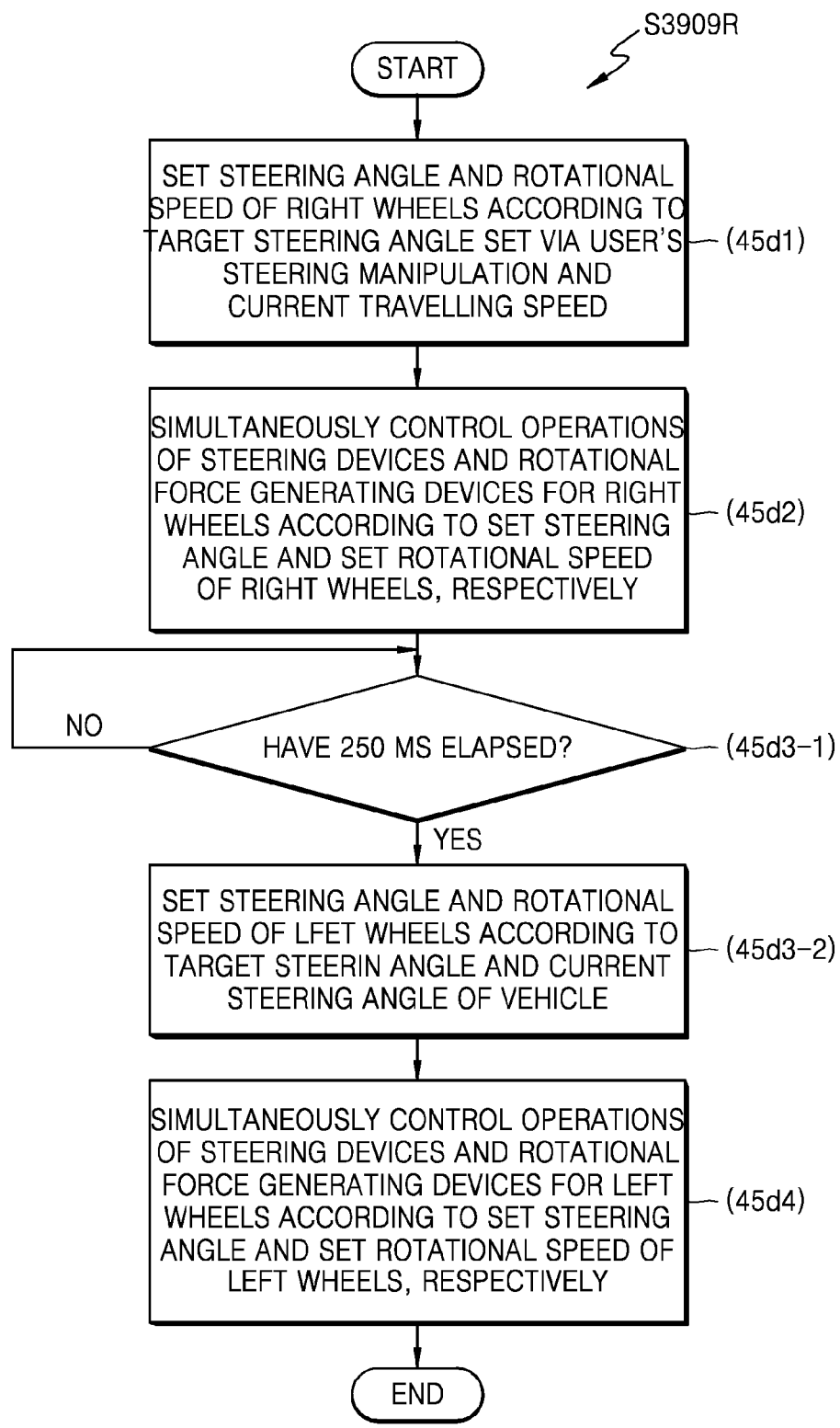
FIG. 45 is a flowchart of a detailed process of operation of performing steering in the right direction in the steering operation shown in FIG. 39.
Figure 46:
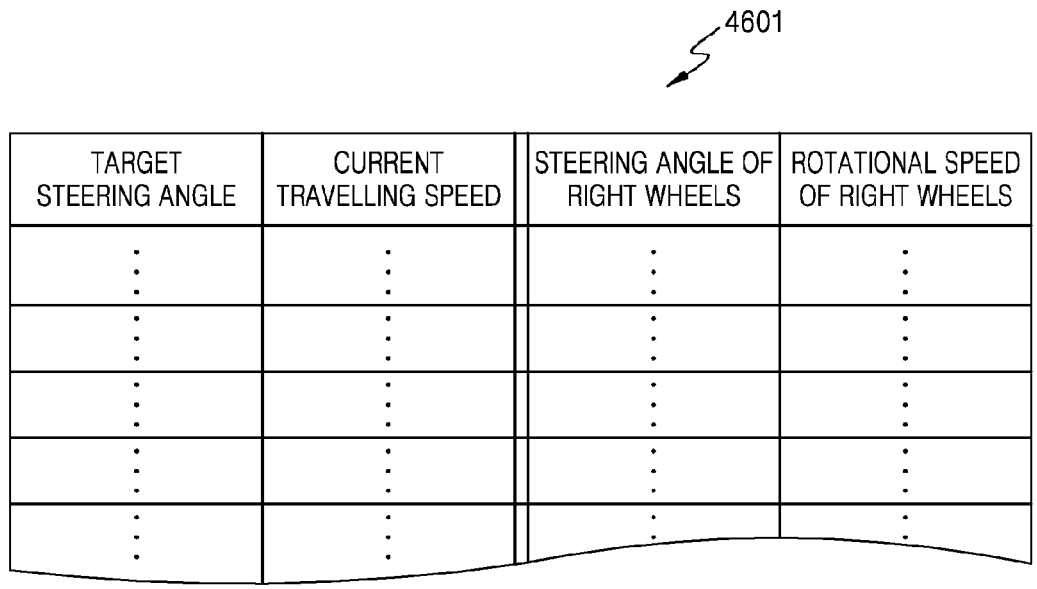
FIG. 46 illustrates an example of a LUT for performing operation 45d1 shown in FIG. 45.
Figure 47:
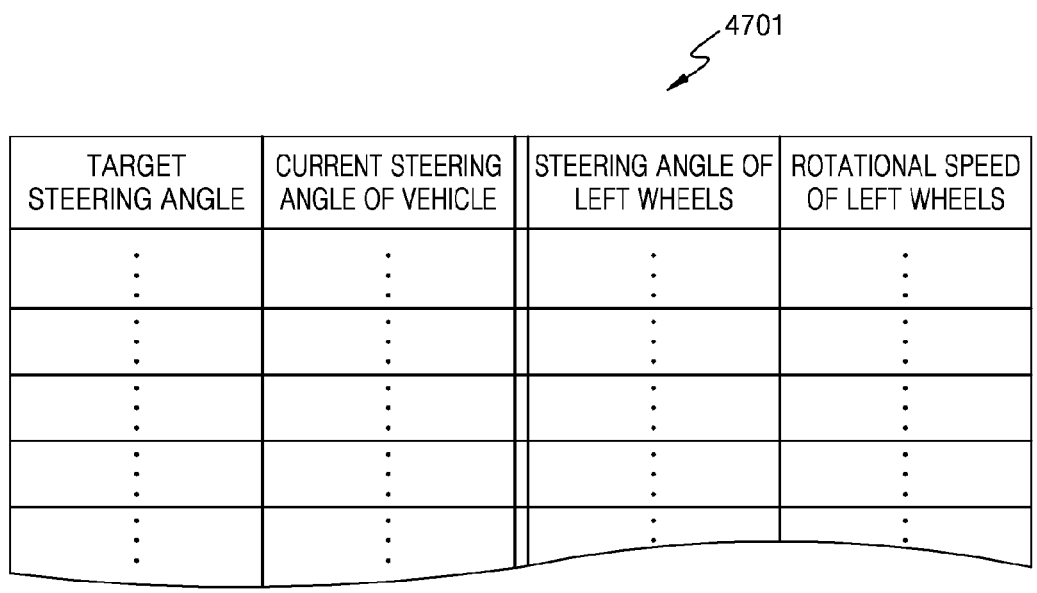
FIG. 47 illustrates an example of a LUT for performing operation 45d3-2 shown in FIG. 45.

FIG. 45 is a flowchart of a detailed process of operation S3909R of performing steering in the right direction in the steering operation S3909 shown in FIG. 39, and FIG. 46 illustrates an example of a LUT 4601 for performing operation 45d1 shown in FIG. 45. FIG. 47 illustrates an example of a LUT 4701 for performing operation 45d3-2 shown in FIG. 45.

The detailed process of operation S3909R of performing steering in the right direction in the steering operation S3909 will now be described in detail with reference to FIGS. 44 through 47.

First, the controller 292 reads the LUT 4601 and sets a steering angle and a rotational speed of the right wheels Wfr and Wrr in accordance with a target steering angle set via a user's steering manipulation and a current travelling speed (operation 45d1).

Then, the controller 292 controls an operation of the steering devices Sfr and Srr for the right wheels Wfr and Wrr according to the set steering angle of the right wheels Wfr and Wrr while simultaneously controlling operation of the rotational force generating devices Mfr and Mrr for the right wheels Wfr and Wrr according to the set rotational speed of the right wheels Wfr and Wrr (operation 45d2).

Next, after a lapse of a set time of 250 ms from the point in time T1 when control of operations of the steering device Sfr and Srr and the rotational force generating devices Mfr and Mrr for the right wheels Wfr and Wrr starts (operation 45*d*3-1), the controller 292 reads the LUT 4701 and sets a steering angle and a rotational speed of the left wheels Wfl and Wrl in accordance with a target steering angle and a current steering angle of the vehicle 29 (operation 45*d*3-2).

Thus, the target steering angle and the rotational speed of the left wheels Wfl and Wrl may be further adaptively set according to the target steering angle and the current steering angle of the vehicle 29.

Thereafter, the controller 292 simultaneously controls operations of the steering devices Sfl and Srl and the rotational force generating devices Mfl and Mrl for the left wheels Wfl and Wrl according to the set steering angle and the set rotational speed of the left wheels Wfl and Wrl, respectively (operation 45*d*4).

INDUSTRIAL APPLICABILITY

The inventive concept may also be used to control an operation of joints of robots as well as an operation of a vehicle.

The invention claimed is:

1. A method of controlling, by a controller, a vehicle equipped with individual steering devices and individual rotational force generating devices for respective wheels, wherein an operation of at least one group of the steering devices and the rotational force generating devices is controlled in response to electrical control signals generated according to a user's command, so that control of the wheels starts separately at different points in time, the method comprising:
performing stable steering by controlling, by the controller, the operation of the steering devices in a stable steering mode so that steering of front wheels starts at a point in time that is different from a point in time when steering of rear wheels starts; and
performing efficient steering by controlling, by the controller, the operation of the steering devices in an efficient steering mode so that steering of left wheels starts at a point in time that is different from a point in time when steering of right wheels starts,
wherein an operation of the steering devices is controlled by varying points in time when steering of the wheels starts according to a steering mode, and
wherein the performing of the stable steering comprises:
(a1) setting, by the controller, a steering angle of the front wheels according to a target steering angle set via user's manipulation of steering and a current travelling speed;
(a2) controlling, by the controller, an operation of the steering devices for the front wheels according to the set steering angle of the front wheels;
(a3) setting, by the controller, after a lapse of a set time from a point in time when control of the operation of the steering devices for the front wheels starts, a steering angle of the rear wheels according to the target steering angle and a current steering angle of the vehicle; and
(a4) controlling, by the controller, an operation of the steering devices for the rear wheels according to the set steering angle of the rear wheels.

2. A method of controlling, by a controller, a vehicle equipped with individual steering devices and individual rotational force generating devices for respective wheels, wherein an operation of at least one group of the steering devices and the rotational force generating devices is controlled in response to electrical control signals generated according to a user's command, so that control of the wheels starts separately at different points in time, the method comprising:
performing stable steering by controlling, by the controller, the operation of the steering devices in a stable steering mode so that steering of front wheels starts at a point in time that is different from a point in time when steering of rear wheels starts; and
performing efficient steering by controlling, by the controller, the operation of the steering devices in an efficient steering mode so that steering of left wheels starts at a point in time that is different from a point in time when steering of right wheels starts,
wherein an operation of the steering devices is controlled by varying points in time when steering of the wheels starts according to a steering mode,
wherein in the performing of the efficient steering, if the steering is performed in the left direction, steering of the left wheels starts earlier than steering of the right wheels, and
wherein if the efficient steering is performed in the right direction, steering of the right wheels starts earlier than steering of the left wheels, and
wherein if the efficient steering is performed in the left direction, the performing of the efficient steering comprises:
(b1) setting, by the controller, a steering angle of the left wheels according to a target steering angle set via user's manipulation of steering and a current travelling speed;
(b2) controlling, by the controller, an operation of the steering devices for the left wheels according to the set steering angle of the left wheels;
(b3) setting, by the controller, after a lapse of a set time from a point in time when control of the operation of the steering devices for the left wheels starts, a steering angle of the right wheels according to the target steering angle and a current steering angle of the vehicle; and
(b4) controlling, by the controller, an operation of the steering devices for the right wheels according to the set steering angle of the right wheels.

3. A method of controlling, by a controller, a vehicle equipped with individual steering devices and individual rotational force generating devices for respective wheels, wherein an operation of at least one group of the steering devices and the rotational force generating devices is controlled in response to electrical control signals generated according to a user's command, so that control of the wheels starts separately at different points in time, the method comprising:
performing stable steering by controlling, by the controller, the operation of the steering devices in a stable steering mode so that steering of front wheels starts at a point in time that is different from a point in time when steering of rear wheels starts; and
performing efficient steering by controlling, by the controller, the operation of the steering devices in an efficient steering mode so that steering of left wheels starts at a point in time that is different from a point in time when steering of right wheels starts,
wherein an operation of the steering devices is controlled by varying points in time when steering of the wheels starts according to a steering mode,
wherein in the performing of the efficient steering, if the steering is performed in the left direction, steering of the left wheels starts earlier than steering of the right wheels, and wherein if the efficient steering is performed in the right direction, steering of the right wheels starts earlier than steering of the left wheels, and wherein if the efficient steering is performed in the right direction, the performing of the efficient steering comprises:

(c1) setting, by the controller, a steering angle of the right wheels according to a target steering angle set via user's manipulation of steering and a current travelling speed;

(c2) controlling, by the controller, an operation of the steering devices for the right wheels according to the set steering angle of the right wheels;

(c3) setting, by the controller, after a lapse of a set time from a point in time when control of the operation of the steering devices for the right wheels starts, a steering angle of the left wheels according to the target steering angle and a current steering angle of the vehicle; and (c4) controlling, by the controller, an operation of the steering devices for the right wheels according to the set steering angle of the left wheels.

4. A method of controlling, by a controller, a vehicle equipped with individual steering devices and individual rotational force generating devices for respective wheels, wherein an operation of at least one group of the steering devices and the rotational force generating devices is controlled in response to electrical control signals generated according to a user's command, so that control of the wheels starts separately at different points in time, the method comprising:

performing stable steering by controlling, by the controller, operations of the steering devices and the rotational force generating devices in a stable steering mode so that steering of front wheels starts at a point in time that is different from a point in time when steering of rear wheels starts; and performing efficient steering by controlling, by the controller, operations of the steering devices and the rotational force generating devices in an efficient steering mode so that steering of left wheels starts at a point in time that is different from a point in time when steering of right wheels starts, wherein an operation of the steering devices is controlled by varying, by the controller, points in time when steering of the wheels starts according to a steering mode, wherein the performing of the stable steering comprises:

(d1) setting, by the controller, a steering angle and a rotational speed of the front wheels according to a target steering angle set via user's manipulation of steering and a current travelling speed;

(d2) controlling, by the controller, an operation of the steering devices for the front wheels according to the set steering angle of the front wheels while simultaneously controlling operation of the rotational force generating devices for the front wheels according to the set rotational speed of the front wheels;

(d3) setting, by the controller, after a lapse of a set time from a point in time when control of the operations of the steering devices and the rotational force generating devices for the front wheels starts, a steering angle and a rotational speed of the rear wheels according to the target steering angle and a current steering angle of the vehicle; and (d4) controlling, by the controller, an operation of the steering devices for the rear wheels according to the set steering angle of the rear wheels while simultaneously controlling operation of the rotational force generating devices for the rear wheels according to the set rotational speed of the rear wheels.

5. A method of controlling, by a controller, a vehicle equipped with individual steering devices and individual rotational force generating devices for respective wheels, wherein an operation of at least one group of the steering devices and the rotational force generating devices is controlled in response to electrical control signals generated according to a user's command, so that control of the wheels starts separately at different points in time, the method comprising:

performing stable steering by controlling, by the controller, operations of the steering devices and the rotational force generating devices in a stable steering mode so that steering of front wheels starts at a point in time that is different from a point in time when steering of rear wheels starts; and performing efficient steering by controlling, by the controller, operations of the steering devices and the rotational force generating devices in an efficient steering mode so that steering of left wheels starts at a point in time that is different from a point in time when steering of right wheels starts, wherein an operation of the steering devices is controlled by varying, by the controller, points in time when steering of the wheels starts according to a steering mode, and wherein if the efficient steering is performed in the left direction, the performing of the efficient steering comprises:

(e1) setting, by the controller, a steering angle and a rotational speed of the left wheels according to a target steering angle set via user's manipulation of steering and a current travelling speed;

(e2) controlling, by the controller, an operation of the steering devices for the left wheels according to the set steering angle of the left wheels while simultaneously controlling operation of the rotational force generating devices for the left wheels according to the set rotational speed of the left wheels;

(e3) setting, by the controller, after a lapse of a set time from a point in time when control of the operations of the steering devices and the rotational force generating devices for the left wheels starts, a steering angle and a rotational speed of the right wheels according to the target steering angle and a current steering angle of the vehicle; and (e4) controlling, by the controller, an operation of the steering devices for the right wheels according to the set steering angle of the right wheels while simultaneously controlling operation of the rotational force generating devices for the right wheels according to the set rotational speed of the right wheels.

6. A method of controlling, by a controller, a vehicle equipped with individual steering devices and individual rotational force generating devices for respective wheels, wherein an operation of at least one group of the steering devices and the rotational force generating devices is controlled in response to electrical control signals generated according to a user's command, so that control of the wheels starts separately at different points in time, the method comprising:

performing stable steering by controlling, by the controller, operations of the steering devices and the rotational force generating devices in a stable steering mode so that steering of front wheels starts at a point in time that is different from a point in time when steering of rear wheels starts; and performing efficient steering by controlling, by the controller, operations of the steering devices and the rotational force generating devices in an efficient steering mode so that steering of left wheels starts at a point in time that is different from a point in time when steering of right wheels starts, wherein an operation of the steering devices is controlled by varying, by the controller, points in time when steering of the wheels starts according to a steering mode, wherein if the efficient steering is performed in the right direction, the performing of the efficient steering comprises:

(f1) setting, by the controller, a steering angle and a rotational speed of the right wheels according to a target steering angle set via user's manipulation of steering and a current travelling speed;

(f2) controlling, by the controller, an operation of the steering devices for the right wheels according to the set steering angle of the right wheels while simultaneously controlling operation of the rotational force generating devices for the right wheels according to the set rotational speed of the right wheels;

(f3) setting, by the controller, after a lapse of a set time from a point in time when control of the operations of the steering devices and the rotational force generating devices for the right wheels starts, a steering angle and a rotational speed of the left wheels according to the target steering angle and a current steering angle of the vehicle; and (f4) controlling, by the controller, an operation of the steering devices for the left wheels according to the set steering angle of the left wheels while simultaneously controlling operation of the rotational force generating devices for the left wheels according to the set rotational speed of the left wheels.

7. A method of controlling, by a controller, a vehicle equipped with individual steering devices and individual rotational force generating devices for respective wheels, wherein an operation of at least one group of the steering devices and the rotational force generating devices is controlled in response to electrical control signals generated according to a user's command, so that control of the wheels starts separately at different points in time, the method comprising:

performing speed acceleration by controlling, by the controller, an operation of the rotational force generating devices in a speed acceleration mode so that control of the front wheels starts at a point in time that is different from a point in time when control of the rear wheels starts; and performing braking by controlling, by the controller, an operation of the rotational force generating devices in a braking mode so that control of wheels on a first diagonal line starts at a point in time that is different from a point in time when control of wheels on a second diagonal line starts.

8. The method of claim 7, wherein in the performing of the speed acceleration by the controller, a difference between the points in time is 10 ms to 1,500 ms, and wherein in the performing of the braking, a difference between the points in time is 10 ms to 1,500 ms.

9. The method of claim 7, wherein in the performing of the speed acceleration by the controller, driving of the front wheels starts earlier than driving of the rear wheels.

10. The method of claim 9, wherein the performing of the speed acceleration by the controller comprises:

(32a1) setting, by the controller, a rotational speed of the front wheels according to a target speed set via a user's command and a current travelling speed;

(32a2) controlling, by the controller, an operation of the rotational force generating devices for the front wheels according to the set rotational speed of the front wheels;

(32a3) setting, by the controller, after a lapse of a set time from a point in time when control of the operation of the rotational force generating devices for the front wheels starts, a rotational speed of the rear wheels according to the target speed and a current traveling speed; and (32a4) controlling, by the controller, an operation of the rotational force generating devices for the rear wheels according to the set rotational speed of the rear wheels.

11. The method of claim 7, wherein the braking comprises:

(36b1) setting, by the controller, a rotational speed of the wheels on the first diagonal line according to a target speed set via a user's command and a current travelling speed;

(36b2) controlling, by the controller an operation of the rotational force generating devices for the wheels on the first diagonal line according to the set rotational speed of the wheels on the first diagonal line;

(36b3) setting, by the controller, after a lapse of a set time from a point in time when control of the operation of the rotational force generating devices for the wheels on the first diagonal line starts, a rotational speed of the wheels on the second diagonal line according to the target speed and a current speed of the vehicle; and (36b4) controlling, by the controller, an operation of the rotational force generating devices for the wheels on the second diagonal line according to the set rotational speed of the wheels on the second diagonal line.

12. The method of claim 7, further comprising performing steering by controlling, by the controller, the steering devices and the rotational force generating devices so that steering of the left wheels starts at a point in time that is different from a point in time when steering of the right wheels starts in a steering mode.

13. The method of claim 12, wherein in the steering mode, a difference between the points in time is 10 ms to 1,500 ms.

14. The method of claim 12, wherein in the performing of the steering by the controller, if the steering is performed in the left direction, steering of the left wheels starts earlier than steering of the right wheels, and wherein if the steering is performed by the controller, in the right direction, steering of the right wheels starts earlier than steering of the left wheels.

15. The method of claim 14, wherein if the steering is performed by the controller in the left direction, the performing of the steering comprises:

(41c1) setting, by the controller, a steering angle and a rotational speed of the left wheels according to a target steering angle set via a user's command and a current travelling speed;

(41c2) controlling, by the controller, an operation of the steering devices for the left wheels according to the set steering angle of the left wheels while simultaneously controlling operation of the rotational force generating devices for the left wheels according to the set rotational speed of the left wheels;

(41c3) setting, by the controller, after a lapse of a set time from a point in time when control of the operations of the steering devices and the rotational force generating devices for the left wheels starts, a steering angle and a rotational speed of the right wheels according to the target steering angle and a current steering angle of the vehicle; and (41c4) controlling, by the controller, an operation of the steering devices for the right wheels according to the set steering angle of the right wheels while simultaneously controlling operation of the rotational force generating devices for the right wheels according to the set rotational speed of the right wheels.

16. The method of claim 14, wherein if the steering is performed in the right direction, the performing of the steering comprises:

(45d1) setting, by the controller, a steering angle and a rotational speed of the right wheels according to a target steering angle set via a user's command and a current travelling speed;

(45d2) controlling, by the controller, an operation of the steering devices for the right wheels according to the set steering angle of the right wheels while simultaneously controlling operation of the rotational force generating devices for the right wheels according to the set rotational speed of the right wheels;

(45d3) setting, by the controller, after a lapse of a set time from a point in time when control of the operations of the steering devices and the rotational force generating devices for the right wheels starts, a steering angle and a rotational speed of the left wheels according to the target steering angle and a current steering angle of the vehicle; and (45d4) controlling, by the controller, an operation of the steering devices for the left wheels according to the set steering angle of the left wheels while simultaneously controlling operation of the rotational force generating devices for the left wheels according to the set rotational speed of the left wheels.

17. A vehicle equipped with individual steering devices and individual rotational force generating devices for respective wheels, wherein operation of at least one group of the steering devices and the rotational force generating devices is controlled by a controller in response to electrical control signals generated according to a user's command, so that control of the wheels by the controller starts separately at different points in time, wherein in a speed acceleration mode, operation of the rotational force generating devices is controlled by making, by the controller, a point in time when control of front wheels starts different from a point in time when control of rear wheels starts; and wherein in a braking mode, operation of the rotational force generating devices is controlled by making, by the controller, a point in time when control of wheels on a first diagonal line starts different from a point in time when control of wheels on a second diagonal line starts.

18. The vehicle of claim 17, wherein in a steering mode, operations of the steering devices and the rotational force generating devices are controlled by making, by the controller, a point in time when steering of left wheels starts different from a point in time when steering of right wheels starts.

* * * * *